United States Patent
Ho et al.

(10) Patent No.: US 11,510,261 B2
(45) Date of Patent: Nov. 22, 2022

(54) ADDRESS TRANSLATION FOR MULTI-LINK OPERATION IN A WIRELESS LOCAL AREA NETWORK (WLAN)

(71) Applicant: QUALCOMM Incorporated, San Diego, CA (US)

(72) Inventors: Sai Yiu Duncan Ho, San Diego, CA (US); George Cherian, San Diego, CA (US); Abhishek Pramod Patil, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 134 days.

(21) Appl. No.: 17/031,840

(22) Filed: Sep. 24, 2020

(65) Prior Publication Data

US 2021/0100050 A1    Apr. 1, 2021

Related U.S. Application Data

(60) Provisional application No. 62/906,689, filed on Sep. 26, 2019.

(51) Int. Cl.
*H04W 76/15*    (2018.01)
*H04W 8/22*    (2009.01)
(Continued)

(52) U.S. Cl.
CPC ............ *H04W 76/15* (2018.02); *H04W 8/22* (2013.01); *H04W 8/26* (2013.01); *H04W 80/02* (2013.01); *H04W 88/08* (2013.01); *H04W 84/12* (2013.01)

(58) Field of Classification Search
CPC ......... H04W 76/15; H04W 8/22; H04W 8/26; H04W 80/02; H04W 88/08; H04W 84/12;
(Continued)

(56) References Cited

U.S. PATENT DOCUMENTS

2014/0056209 A1* 2/2014 Park ................ H04W 88/04
370/315
2018/0235002 A1* 8/2018 Son ................. H04W 74/08

FOREIGN PATENT DOCUMENTS

WO    2021062153    4/2021

OTHER PUBLICATIONS

"PCT Application No. PCT/US2020/052716 International Search Report and Written Opinion", dated Nov. 18, 2020, 14 pages.
(Continued)

*Primary Examiner* — Will W Lin
(74) *Attorney, Agent, or Firm* — Holland & Hart LLP

(57) ABSTRACT

This disclosure provides methods, devices and systems for wireless communication, and particularly for address translation during multi-link operation in a wireless local area network (WLAN). The method may include establishing one or more wireless communication links with a station (STA) including a first wireless communication link. The method may include receiving, via the first wireless communication link, a first frame including a first address field that includes a first link media access control (MAC) address associated with the STA. The method may include determining that the STA is associated with a first network MAC address. The method may include removing the first link MAC address from the first address field of the first frame, and inserting the first network MAC address of the STA in a second address field of the first frame. The method may include transmitting the first frame to a first local area network (LAN) device.

30 Claims, 12 Drawing Sheets

(51) Int. Cl.
  *H04W 8/26*    (2009.01)
  *H04W 80/02*   (2009.01)
  *H04W 88/08*   (2009.01)
  *H04W 84/12*   (2009.01)

(58) Field of Classification Search
  CPC ............................ H04W 88/10; H04W 88/06;
       H04L 2101/622; H04L 2101/677; H04L
                                    61/2596
  See application file for complete search history.

(56)             References Cited

OTHER PUBLICATIONS

Nandagopalan, "Multi-Band Multi-Channel Concept in IEEE 802. 11 be—A Simple Study", Jun. 2019, 22 pages.
Wang, et al., "Follow Up Discussion on Multi-link Operations", Jan. 2020, 13 pages.

* cited by examiner

ADDRESS TRANSLATION FOR MULTI-LINK OPERATION IN A WIRELESS LOCAL AREA NETWORK (WLAN)

CROSS-REFERENCE TO RELATED APPLICATIONS

This patent application claims priority to U.S. Provisional Patent Application No. 62/906,689 filed Sep. 26, 2019, entitled "ADDRESS TRANSLATION FOR MULTI-LINK OPERATION IN A WIRELESS LOCAL AREA NETWORK (WLAN)," and assigned to the assignee hereof. The disclosure of the prior application is considered part of and is incorporated by reference in this patent application.

TECHNICAL FIELD

This disclosure relates generally to wireless communication, and more specifically, to multi-link operation in a wireless communication system.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

A STA may obtain a wireless communication link with an AP in response to authenticating with the AP and establishing a wireless session (also referred to as a wireless association, or simply "association") with the AP. Recently, the IEEE is considering new features and new connectivity protocols to improve throughput and reliability. For example, a WLAN communication system may utilize multi-link operation in which multiple wireless communication links are established between a STA and one or more APs of the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication by an access point (AP). The method may include establishing one or more wireless communication links with a station (STA) including a first wireless communication link. The method may include determining that the STA is capable of multiple simultaneous wireless communication links including the first wireless communication link. The method may include receiving, via the first wireless communication link, a first frame including a first address field that includes a first link media access control (MAC) address. The first link MAC address may be associated with the STA. The method may include determining that the STA is associated with a first network MAC address based on the first link MAC address and the determination that the STA is capable of multiple simultaneous wireless communication links. The method may include removing the first link MAC address from the first address field of the first frame. The method may include inserting the first network MAC address of the STA in a second address field of the first frame. The method may include transmitting the first frame with the first network MAC address in the second address field to a first local area network (LAN) device.

Another innovative aspect of the subject matter described in this disclosure can be implemented in an access point (AP). The AP may include at least one modem. The AP may include at least one processor communicatively coupled with the at least one modem. The AP may include at least one memory communicatively coupled with the at least one processor and storing processor-readable code that, when executed by the at least one processor in conjunction with the at least one modem, is configured to perform operations for wireless communications. The processor-readable code may be configured to establish one or more wireless communication links with a station (STA) including a first wireless communication link. The processor-readable code may be configured to determine that the STA is capable of multiple simultaneous wireless communication links including the first wireless communication link. The processor-readable code may be configured to receive, via the first wireless communication link, a first frame including a first address field that includes a first link media access control (MAC) address, the first link MAC address being associated with the STA. The processor-readable code may be configured to determine that the STA is associated with a first network MAC address based on the first link MAC address and the determination that the STA is capable of multiple simultaneous wireless communication links. The processor-readable code may be configured to remove the first link MAC address from the first address field of the first frame. The processor-readable code may be configured to insert the first network MAC address of the STA in a second address field of the first frame. The processor-readable code may be configured to transmit the first frame with the first network MAC address in the second address field to a first local area network (LAN) device.

In some implementations, the methods and AP may be configured to insert a second network MAC address of the AP in the first address field of the first frame. The first frame transmitted to the first LAN device may further include the second network MAC address of the AP in the first address field.

In some implementations, the one or more wireless communication links with the STA may further include a second wireless communication link. The first wireless communication link may be associated with the first link MAC address of the STA and a second link MAC address of the AP. The second wireless communication link may be associated with a third link MAC address of the STA and a fourth link MAC address of the AP. The first link MAC address, the second link MAC address, the third link MAC address and the fourth link MAC address may be different MAC addresses.

In some implementations, the first wireless communication link may be associated with the first link MAC address of the STA and a second link MAC address of the AP. The first frame received via the first wireless communication link may include a 3-address format having the first address field including the first link MAC address of the STA, a third address field including the second link MAC address of the AP, and a fourth address field including a destination address associated with a destination LAN device.

In some implementations, the method and AP may be configured to change a 3-address format of the first frame received from the STA to a 4-address format prior to transmitting the first frame to the first LAN device. The 4-address format may include the first address field including a second network MAC address of the AP, the second address field including the first network MAC address of the STA, a third address field including a third network MAC address of the first LAN device, and a fourth address field including a destination address associated with a destination LAN device.

In some implementations, a second wireless communication link may be established between the STA and a first wireless LAN device. The second wireless communication link may be associated with a second link MAC address of the STA. The AP may be configured as a master AP and the first wireless LAN device may be configured as a non-collocated slave AP for implementing multi-link operations with the AP. The method and AP may be configured to receive a second frame including the first address field that includes the second link MAC address associated with the STA from the first wireless LAN device. The second frame may be obtained by the first wireless LAN device via the second wireless communication link. The method and AP may be configured to determine that the STA is associated with the first network MAC address based on the second link MAC address. The method and AP may be configured to remove the second link MAC address from the first address field of the second frame. The method and AP may be configured to insert the first network MAC address of the STA into the second address field of the second frame. The method and AP may be configured to transmit the second frame with the first network MAC address in the second address field to the first wireless LAN device.

In some implementations, the method and AP may be configured to insert a destination address associated with a destination LAN device into a third address field of the first frame. The first frame transmitted to the first LAN device may have a two-address format including the first network MAC address in the second address field and the destination address in the third address field.

In some implementations, the method and AP may be configured to change a 3-address format of the first frame received from the STA to a 2-address format prior to transmitting the first frame to the first LAN device. The 2-address format may have the second address field including the first network MAC address of the STA and a third address field including a destination address associated with a destination LAN device.

Another innovative aspect of the subject matter described in this disclosure can be implemented in a method for wireless communication by a AP. The method may include establishing a plurality of wireless communication links with a STA including a first wireless communication link and a second wireless communication link. The method may include determining that the STA is capable of multiple simultaneous wireless communication links including the first wireless communication link and the second wireless communication link. The method may include receiving, from a first wireless LAN device, a first frame including a first address field that includes a first network MAC address associated with the STA. The method may include selecting the first wireless communication link from the plurality of wireless communication links for transmitting the first frame to the STA. The method may include determining a first link MAC address of the STA based on the first network MAC address and the determination that the STA is capable of multiple simultaneous wireless communication links. The first link MAC address may be associated with the first wireless communication link. The method may include removing the first network MAC address of the STA from the first address field of the first frame. The method may include inserting the first link MAC address of the STA in a second address field of the first frame. The method may include transmitting, via the first wireless communication link, the first frame with the first link MAC address in the second address field to the STA.

Another innovative aspect of the subject matter described in this disclosure can be implemented in an access point (AP). The AP may include at least one modem. The AP may include at least one processor communicatively coupled with the at least one modem. The AP may include at least one memory communicatively coupled with the at least one processor and storing processor-readable code that, when executed by the at least one processor in conjunction with the at least one modem, is configured to perform operations for wireless communications. The processor-readable code may be configured to establish a plurality of wireless communication links with a station (STA) including a first wireless communication link and a second wireless communication link. The processor-readable code may be configured to determine that the STA is capable of multiple simultaneous wireless communication links including the first wireless communication link and the second wireless communication link. The processor-readable code may be configured to receive, from a first local area network (LAN) device, a first frame including a first address field that includes a first network MAC address associated with the STA. The processor-readable code may be configured to select the first wireless communication link from the plurality of wireless communication links for transmitting the first frame to the STA. The processor-readable code may be configured to determine a first link MAC address of the STA based on the first network MAC address and the determination that the STA is capable of multiple simultaneous wireless communication links, the first link MAC address being associated with the first wireless communication link. The processor-readable code may be configured to remove the first network MAC address of the STA from the first address field of the first frame. The processor-readable code may be configured to insert the first link MAC address of the STA in a second address field of the first frame. The processor-readable code may be configured to transmit, via the first wireless communication link, the first frame with the first link MAC address in the second address field to the STA.

In some implementations, the first frame received from the first LAN device may include a second network MAC address of the AP in the second address field of the first frame. The method and AP may be configured to replace the second network MAC address in the second address field of the first frame with the first link MAC address of the STA.

In some implementations, the method and AP may be configured to transmit the first frame via the first wireless communication link and a second frame via the second wireless communication link concurrently.

In some implementations, the first wireless communication link may be associated with the first link MAC address of the STA and a second link MAC address of the AP. The second wireless communication link may be associated with a third link MAC address of the STA and a fourth link MAC address of the AP. The first link MAC address, the second link MAC address, the third link MAC address and the fourth link MAC address may be different MAC addresses.

In some implementations, the first link MAC address, the second link MAC address, the third link MAC address, and the fourth link MAC address may be used for frame transmissions between the AP and the STA, and the first link MAC address, the second link MAC address, the third link MAC address, and the fourth link MAC address may not be discoverable by other wireless LAN devices.

In some implementations, the first frame received from the first LAN device may include a 4-address format having the first address field including the first network MAC address associated with the STA, the second address field including a second network MAC address of the AP, a third address field including a third network MAC address of the first LAN device, and a fourth address field including a source address associated with a source LAN device.

In some implementations, the method and AP may be configured to change a 4-address format of the first frame received from the first LAN device to a 3-address format prior to transmitting the first frame to the STA. The 3-address format may include the second address field including the first link MAC address of the STA, a third address field including a second link MAC address of the AP, and a fourth address field including a source address associated with a source WLAN device.

In some implementations, the first network MAC address of the STA may be discoverable by other WLAN devices and used by the other WLAN devices to identify frames associated with the STA.

In some implementations, the method may include changing a 2-address format of the first frame received from the first LAN device to a 3-address format prior to transmitting the first frame to the STA. In the 3-address format, the second address field may include the first link MAC address of the STA, a third address field may include a second link MAC address of the AP and a fourth address field may include a network MAC address of the first LAN device.

In some implementations, the method and AP may be configured to insert a network MAC address associated with the first LAN device into a third address field of the first frame and a second link MAC address associated with the AP into a fourth address field of the first frame. The first frame may have a three-address format including the first link MAC address in the second address field, the network MAC address in the third address field and the second link MAC address in the fourth address field.

In some implementations, the first frame may be transmitted to the second WLAN device via the first wireless communication link while the second wireless communication link remains active.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
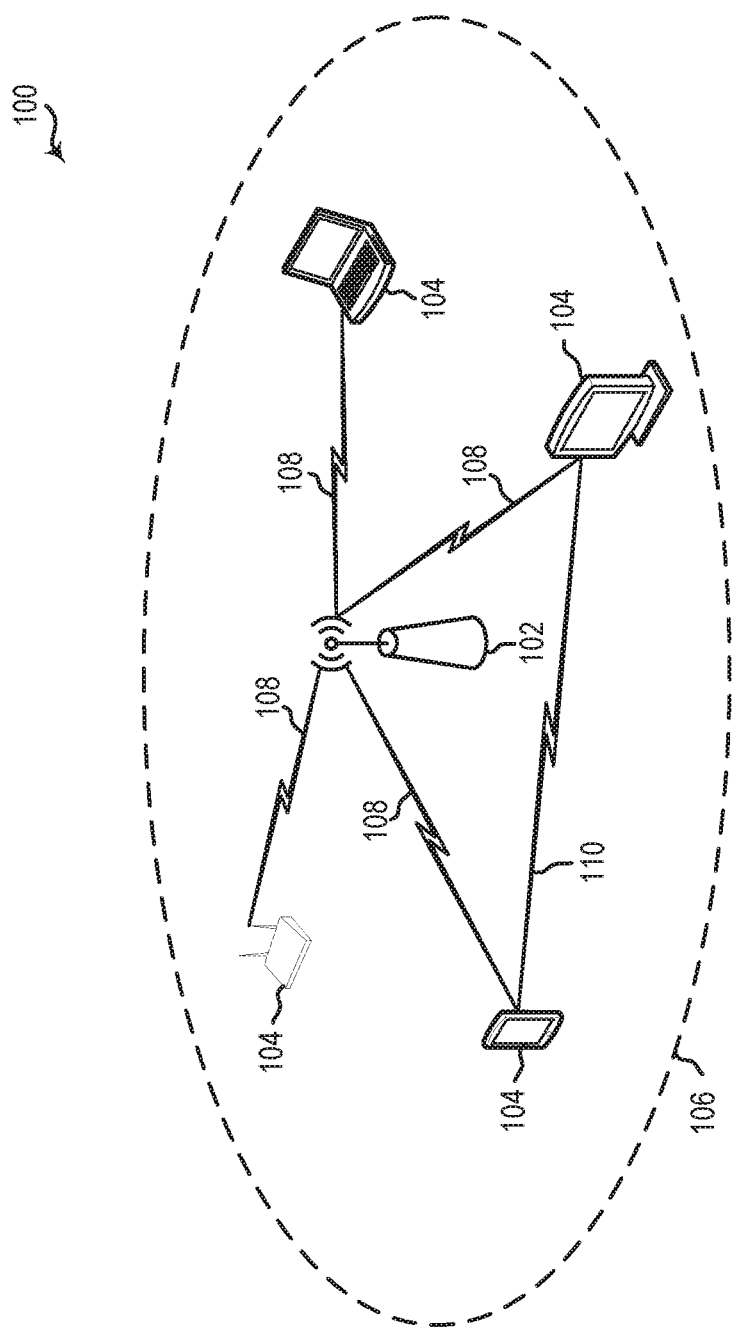
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

A WLAN in a home, apartment, business, or other areas may include one or more WLAN devices. Each WLAN device may have one or more wireless interfaces to communicate via a wireless communication medium with another WLAN device. The wireless communication medium may include one or more wireless channels defined within a wireless frequency band (which may be referred to as a band for simplicity). An access point (AP) is a WLAN device that includes at least one wireless interface as well as a distribution system access function. A station (STA) is a WLAN device that includes at least one wireless interface to communicate with an AP or another STA. Each wireless interface may be an addressable entity that implements wireless communication protocols defined for the WLAN. Recently, the IEEE is defining techniques for multi-link communication in which a WLAN device (such as a STA) may establish concurrent communication links on more than one band or more than one channel in a single band. In some implementation, the concurrent communication links may be established using the same wireless association. The communication links may be established on different channels, frequency bands, or spatial streams, among other examples. In some implementations, a first communication link may be established on a first frequency band (such as 2.4 GHz) while the second communication link may be established on a second frequency band (such as the 5 GHz band or 6 GHz band).

Multi-link communication may enable a STA to experience a better quality of service (QoS) such as higher throughput, reliability, or redundancy, among other examples. For example, multi-link communication may enable multi-link aggregation (MLA) in which multiple communication links can be used to concurrently transmit data. Multi-link operation refers to packet-level or link-level aggregation when one or more APs communicate with a STA (or vice versa) using multiple communication links. Multi-link communication may also enable retransmission of data using different ones of the communication links.

Various implementations relate generally to MAC address considerations when forwarding a frame during multi-link operation. In some implementations, an AP that has two or more communication links with a STA may perform address translation when forwarding an uplink (UL) frame received from the STA via one of the communication links between the STA and the AP. The communication link may be associated with a link MAC address of the STA and a link MAC address of the AP. The link MAC address of the STA and the link MAC address of the AP may be known or discoverable only by the STA and the AP that established the first communication link (and may be hidden from or not discoverable by other WLAN devices). During a wireless association process, the AP and the STA may exchange link MAC addresses associated with the multiple communication links between the AP and the STA. For example, during the wireless association process, the STA may indicate to the AP that the link MAC address is associated with the communication link. The STA also may indicate the link MAC address of the STA is associated with a network MAC address of the STA. The network MAC address is the MAC address that is discoverable by other WLAN devices and used to identify the STA in the WLAN.

When the AP receives the UL frame from the STA, the AP may identify the link MAC address of the STA in the UL frame and determine that the STA transmitted the UL frame. The AP also may determine the network MAC address of the STA based on the link MAC address. In some implementations, the AP may translate the UL frame having a 3-address format including the link MAC address to a 4-address format including the network MAC address when forwarding the UL frame to the WLAN. The other WLAN devices in the WLAN may identify that the UL frame originated from the STA based on the network MAC address. In some implementations, the AP may similarly perform address translation when forwarding a downlink (DL) frame received from the WLAN to the STA via one of the multiple communication links. For example, the AP may translate the DL frame having a 4-address format including the network MAC address to a 3-address format including the link MAC address when forwarding the DL frame to the STA.

Particular implementations of the subject matter described in this disclosure can be implemented to realize one or more of the following potential advantages. One or more APs that have direct communication links to the STA perform address translation using different link MAC addresses when forwarding a DL or UL frame as part of a multi-link communication. Additionally, while other network devices (different from the AP(s) that provide the direct communication links) may be unable to recognize the different link MAC addresses as being related to the same STA, the APs that perform the address translation can also obfuscate the link MAC addresses such that the STA may be represented to the WLAN as having a single network MAC address. The other network devices of the WLAN can communication with the STA using the single network MAC address from anywhere in the WLAN, while only the APs that have the direct communication links use the link MAC addresses to communicate with the STA via multiple communication links to increase throughput, reliability, and redundancy.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct wireless link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2A:
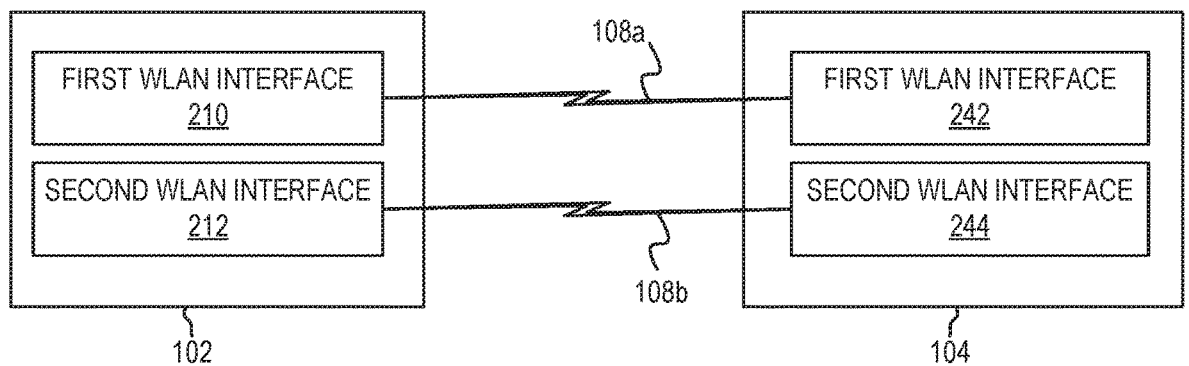
FIG. 2A shows a pictorial diagram of an example system that implements multi-link operation.

FIG. 2A shows a pictorial diagram of an example system 201 that implements multi-link operation. The AP 102 may include multiple wireless interfaces (such as a first WLAN interface 210 and a second WLAN interface 212). Although two WLAN interfaces are shown in the AP 102, there may be a different quantity of WLAN interfaces in various implementations. The STA 104 also may include multiple wireless interfaces (such as a first WLAN interface 242 and a second WLAN interface 244).

The STA 104 may establish multiple communication links (shown as first communication link 108a and second communication link 108b) with the AP 102. For example, the first communication link 108a may be established between the first WLAN interface 242 of the STA 104 and the first WLAN interface 210 of the AP 102. The second communication link 108b may be established between the second WLAN interface 244 of the STA 104 and the second WLAN interface 212 of the AP 102.

Figure 2B:
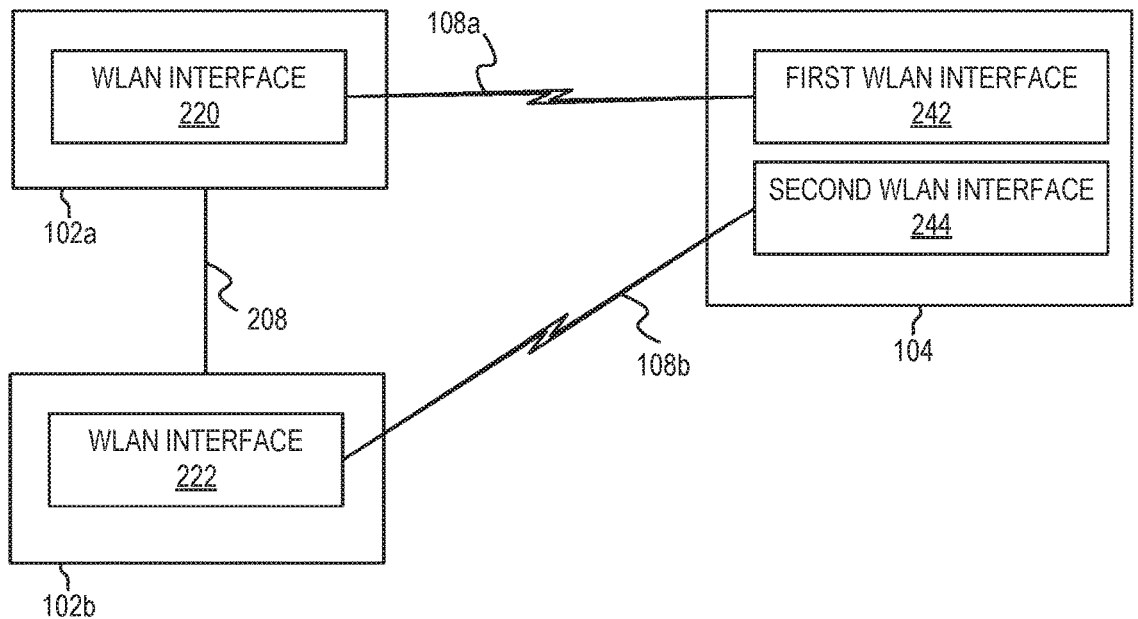
FIG. 2B shows a pictorial diagram of another example system that implements multi-link operation.

FIG. 2B shows a pictorial diagram of another example system 202 that implements multi-link operation. In the second example system 202, the STA 104 may establish multiple communication links 108a and 108b with non-collocated APs 102a and 102b, respectively. For example, the STA 104 may establish a first communication link 108a to a WLAN interface 220 of the AP 102a using the first WLAN interface 242 of the STA 104. The STA 104 may establish a second communication link 108b to a WLAN interface 222 of the AP 102b using the second WLAN interface 244 of the STA 104. The APs 102a and 102b may communicate with each other using a wired or wireless communication link 208. For example, the non-collocated APs 102a and 102b may coordinate multi-link operations for the STA 104 via the wired or wireless communication link 208.

Figure 3A:
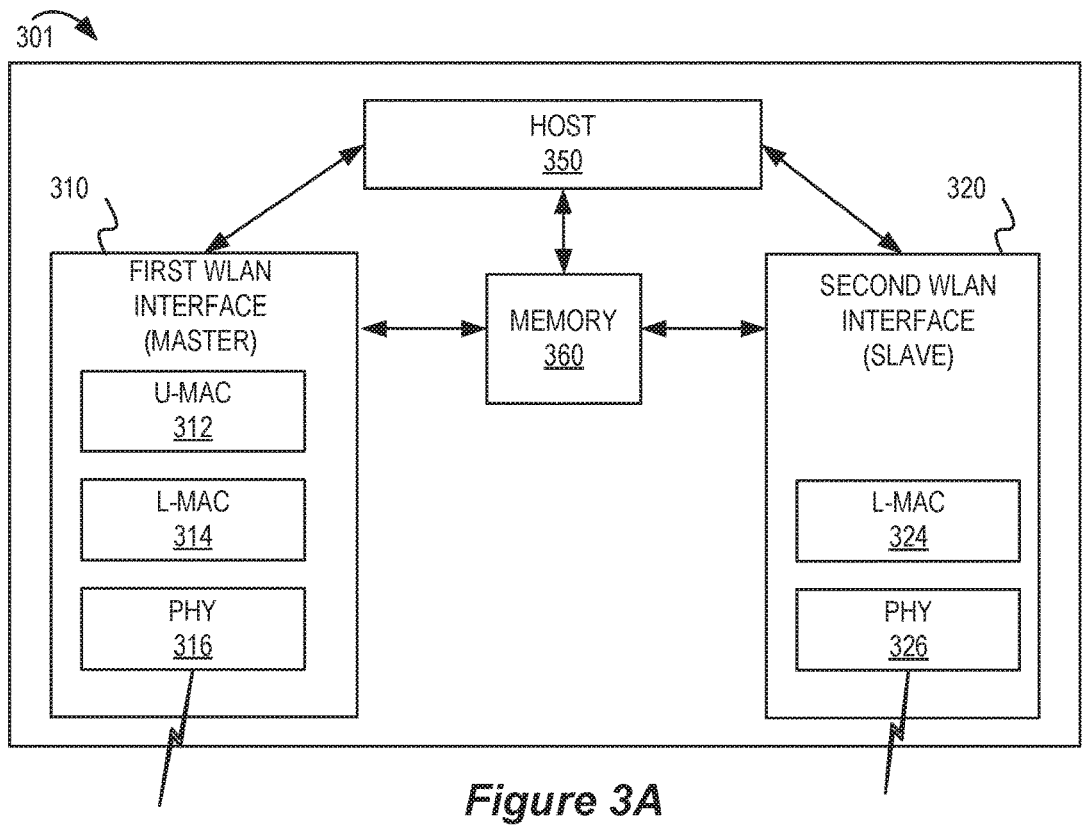
FIG. 3A shows a block diagram of an example wireless local area network (WLAN) device that supports multi-link operation.

FIG. 3A shows a block diagram of an example WLAN device 301 that supports multi-link operation. The WLAN device 301 may be a STA (such as STA 104) or an AP (such any of the APs 102 described herein). The WLAN device 301 includes a first WLAN interface 310 and a second WLAN interface 320. In the example of FIG. 3A, the first WLAN interface 310 may be a master WLAN interface for a group of WLAN interfaces that includes the first WLAN interface 310 and the second WLAN interface 320. The second WLAN interface 320 may be a slave WLAN interface in the group of WLAN interfaces. A host 350 may operate as a relay to coordinate communication between the first WLAN interface 310 and the second WLAN interface 320. The WLAN device 301 may include memory 360 which is accessible and used by both the first WLAN interface 310 and the second WLAN interface 320 to store or retrieve buffered frames or packets.

The first WLAN interface 310 may include a master MAC layer (also referred to as an upper MAC (U-MAC) 312), which has a corresponding network MAC address). The first WLAN interface 310 also includes a link MAC layer (also referred to as a lower MAC (L-MAC) 314) and a PHY layer 316. The second WLAN interface 320 includes a link MAC layer (L-MAC 324) and a PHY layer 326. Each WLAN interface 310 and 320 may be configured to establish a communication link with one or more other WLAN devices (not shown). The U-MAC 312 may coordinate with a lower MAC (L-MAC 314 or L-MAC 324) to transmit or receive frames during multi-link operation. The U-MAC 312 also may coordinate retransmissions or acknowledgements via the L-MAC 314 or the L-MAC 324 on behalf of the WLAN device 301. The frames (which also may be referred to as MAC protocol data units, or MPDUs) may include one or more MAC service data units (MSDUs). Each MSDU may include data from or to the host 350. The U-MAC 312 may determine encryption settings, addressing fields, or other parameters for each MPDU.

Figure 3B:
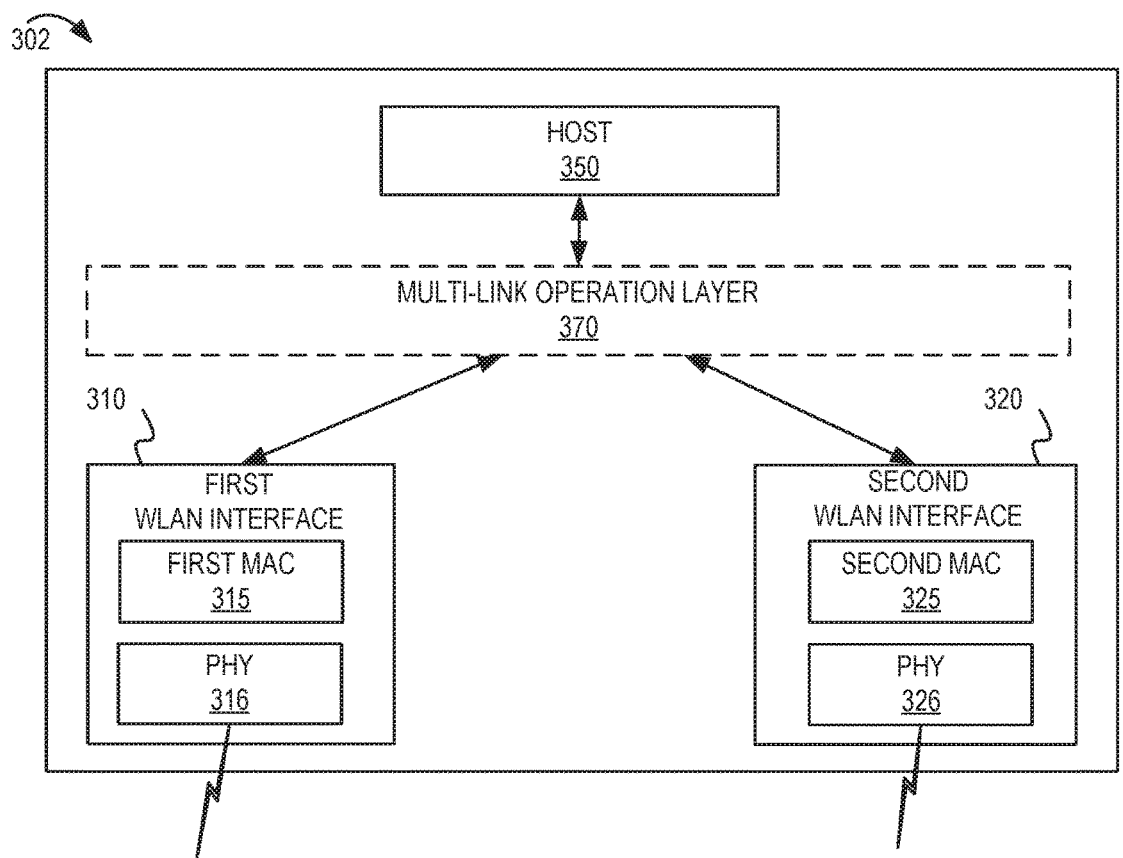
FIG. 3B shows a block diagram of another example WLAN device that supports multi-link operation.

FIG. 3B shows a block diagram of another example WLAN device 302 that supports multi-link operation. The WLAN device 302 may be a STA (such as STA 104) or an AP (such any of the APs 102 described herein). The WLAN device 302 includes a first WLAN interface 310, a second WLAN interface 320, and a host 350. The first WLAN interface 310 includes a first MAC layer 315 and a PHY layer 316. The second WLAN interface 320 includes a second MAC layer 325 and a PHY layer 326.

Furthermore, the WLAN device 302 includes a multi-link operation layer 370. In some implementations, the multi-link operation layer 370 may be implemented in the first WLAN interface 310, the second WLAN interface 320, or the host 350. Collectively, the first WLAN interface 310, the second WLAN interface 320, and the multi-link operation layer 370 may be referred to as a multi-link layer entity (MLLE) or a multi-layer logical entity. The multi-link operation layer 370 may provide a MAC service access point (MAC-SAP) that maintains a common association context (including security settings) and a common acknowledgement scheme that is used by both the first WLAN interface 310 and the second WLAN interface 320.

In some implementations, the APs 102 and the STAs 104 may perform address translation when forwarding uplink (UL) frames or downlink (DL) frames via one of the available communication links during multi-link operation. Also, the APs 102 and the STAs 104 may change the address format (such as between a 3-address format and a 4-address format or vice versa) of the UL frames or DL frames when forwarding the frames during multi-link operation.

Figure 4:
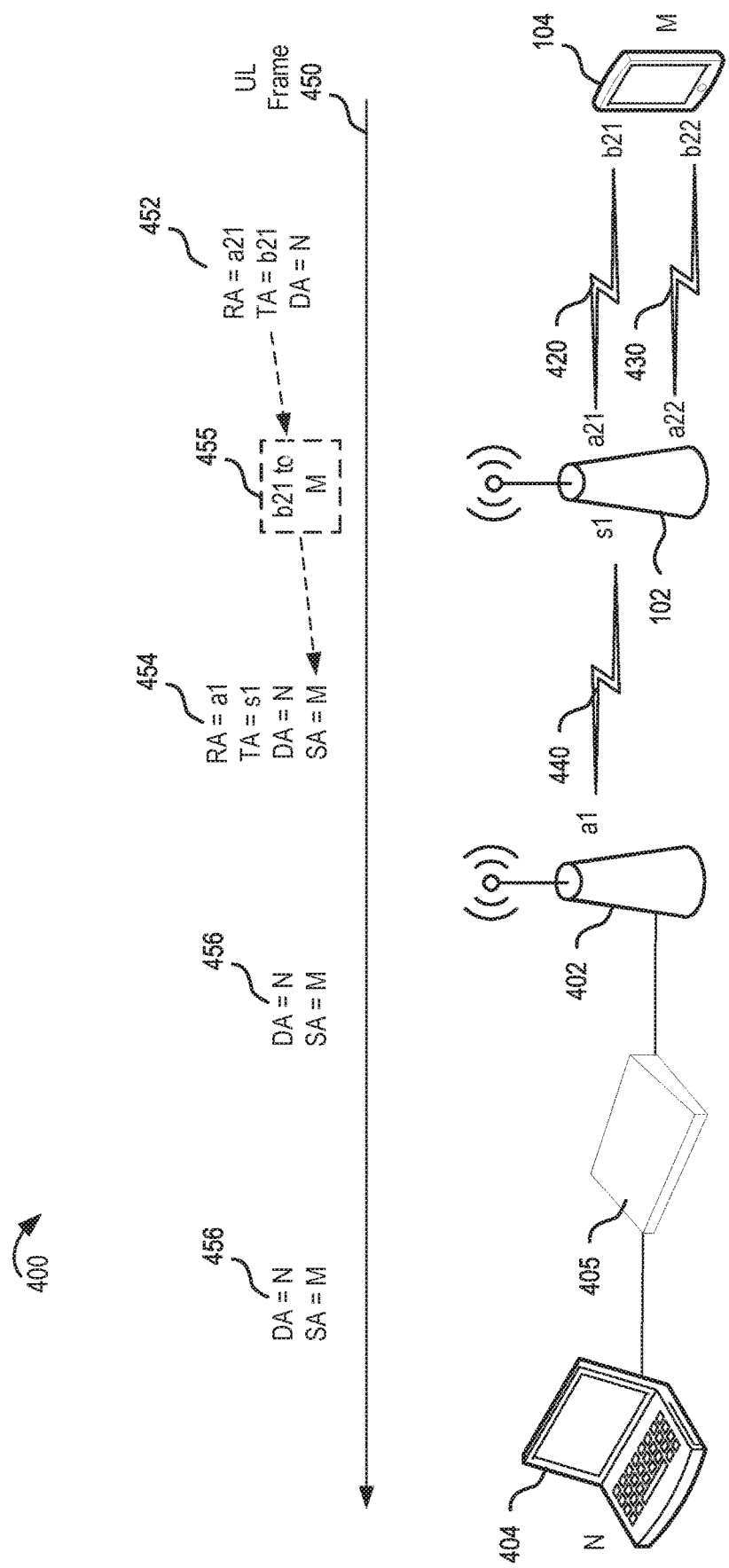
FIG. 4 shows a pictorial diagram of an example wireless communication network that supports performing address translation when forwarding an uplink (UL) frame during multi-link operation according to some implementations.

FIG. 4 shows a pictorial diagram of an example wireless communication network 400 that supports performing address translation when forwarding an UL frame during multi-link operation according to some implementations. According to some aspects, the wireless communication network 400 (hereinafter referred to as WLAN 400) can be an example of the WLAN 100 of FIG. 1. The WLAN 400 may include a STA 104, an AP 102, an AP 402, a router 405, and a STA 404. In some implementations, the WLAN 400 may be a mesh network. In some implementations, the AP 102 may be a relay AP of the WLAN 400 that may relay frames received from one or more STAs (such as the STA 104) to the second AP 402, which may be a main AP or a central AP of the WLAN 400. In some implementations, the STA 104, the AP 102 and the AP 402 may communicate using wireless communications (such as Wi-Fi communications). In some implementations, the AP 402 may communicate with the router 405, and the router 405 may communicate with the STA 404, using wired communications (such as Ethernet).

In some implementations, the STA 104 may use a link MAC address for each of the communication links that are established between the STA 104 and the AP 102. For example, the STA 104 may use a first link MAC address (shown in FIG. 4 as "b21") for the first communication link 420 and a second link MAC address (shown in FIG. 4 as "b22") for the second communication link 430. Each link MAC address of the STA 104 may correspond to a different MAC layer and PHY layer instance (hereinafter referred to as a MAC/PHY instance) of a different WLAN interface of the STA 104. For example, the STA 104 may use a first MAC/PHY instance of a first WLAN interface that is associated with the first link MAC address for the first communication link 420, and a second MAC/PHY instance of a second WLAN interface that is associated with the second link MAC address for the second communication link 430. In some implementations, the first WLAN interface of the STA 104 may be used for the 2.4 GHz frequency band, and the second WLAN interface of the STA 104 may be used for the 5 GHz frequency band). Similar to the STA 104, the AP 102 may use a link MAC address for each of the communication links. For example, the AP 102 may use a third link MAC address (shown in FIG. 4 as "a21") for the first communication link 420 and a fourth link MAC address (shown in FIG. 4 as "a22") for the second communication link 430. Each link MAC address of the AP 102 may correspond to a different MAC/PHY instance of a WLAN interface of the AP 102. In some implementations, the link MAC addresses associated with the AP 102 and the STA 104 may be known or discoverable only to the AP 102 and the STA 104, and may be hidden from or not discoverable by the rest of the WLAN devices of the WLAN 400.

In some implementations, the STA 104 may use a 3-address format 452 in the MAC header for transmitting the UL frame 450 to the AP 102. For example, as shown in FIG. 4, the 3-address format 452 may include a receiver address (RA) field, a transmitter address (TA) field, and a destination address (DA) field. In some implementations, when the STA 104 transmits the UL frame 450 to the AP 102, the TA field may include the first link MAC address (b21) of the STA 104, the RA field may include the third link MAC address (a21) of the AP 102, and the DA field may include the destination address (shown in FIG. 4 as "N") of the STA 404. In some implementations, the RA field may correspond to the address1 (or A1) field of the MAC header, the TA field may correspond to the address2 (or A2) field of the MAC header, and the DA field may correspond to the address3 (or A3) field of the MAC header.

In some implementations, the AP 102 may receive the UL frame 450 having the 3-address format 452 and perform address translation in order to forward the UL frame 450 to the AP 402 via a third communication link 440. The AP 102 also may change the format of the UL frame 450 from a 3-address format 452 to a 4-address format 454 in the MAC header. In some implementations, the 3-address format 452 may be used in the Wi-Fi fronthaul and the 4-address format 454 may be used in the Wi-Fi backhaul. The 4-address format may use a source address (SA) field in addition to the other fields of the 3-address format 452. Thus, the 4-address format 454 may include an RA field, a TA field, a DA field, and an SA field. In some implementations, the AP 102 may translate 455 the first link MAC address that was included in the TA field of the received UL frame 450 into a first network MAC address (shown in FIG. 4 as "M") that is included in the SA field of the forwarded UL frame 450. The first network MAC address may be a layer 2 WLAN MAC address (which also may be referred to as an upper MAC address) that the other WLAN devices on the WLAN 400 use to identify and communicate with the STA 104. In some implementations, during the wireless association process between the STA 104 and the AP 102, the STA 104 may provide the first link MAC address, the second link MAC address, and the first network MAC address to the AP 102. The AP 102 stores a relationship between the first link MAC address, the second link MAC address, and the first network MAC address as all belonging to the STA 104. The AP 102 also relates the first and second link MAC addresses to the first network MAC address. Thus, when the AP 102 identifies the first link MAC address in the UL frame 450, the AP 102 can translate the first link MAC address to the first network MAC address based on the stored address information that was exchanged during the wireless association process. In some implementations, the AP 102 may use a second network MAC address (shown in FIG. 4 as "s1") as a network address for the WLAN 400 and the AP 402 may use a third network MAC address (shown in FIG. 4 as "a1") as the network address for the WLAN 400.

In some implementations, when the AP 102 forwards the UL frame 450 having a 4-address format to the AP 402 via the third communication link 440, the TA field may include the second network MAC address (s1) of the AP 102, the RA field may include the third network MAC address (a1) of the AP 402, the SA field may include the first network MAC address (M) of the STA 104, and the DA field may include the destination address (N) of the STA 404. As described herein, when the AP 102 forwards the UL frame 450 to the AP 402, the AP 102 may translate 455 the first link MAC address (b21) in the TA field of the received UL frame 450 into the first network MAC address (M) that is included in the SA field of the forwarded UL frame 450. For example, the AP 102 may replace the first link MAC address (b21) in the TA field of the received UL frame 450 with the second network MAC address (s1) of the AP 102. The AP 102 may insert the first network MAC address (M) of the STA 104 into the SA field of the forwarded UL frame 450. The AP 102 also may replace the third link MAC address (a21) of the AP 102 in the RA field of the received UL frame 450 with the third network MAC address (a1) of the AP 402. The AP 102 may retain the destination address (N) in the DA field of the received UL frame 450 in the forwarded UL frame 450. In some implementations, the RA field may correspond to the address1 (or A1) field of the MAC header, the TA field may correspond to the address2 (or A2) field of the MAC header, the DA field may correspond to the address3 (or A3) field of the MAC header, and the SA field may correspond to the address4 (or A4) field of the MAC header. In some implementations, when the AP 102 forwards the UL frame 450 to the AP 402 via the third communication link 440, the first communication link 420 and the second communication link 430 may remain active.

In some implementations, the AP 402 may receive the UL frame 450 having the 4-address format that is forwarded from the AP 102 and may forward the UL frame 450 to the router 405. The AP 402 may communicate with the router 405 via a wired connection, such as Ethernet. When the communication link between the AP 402 and the router 405 is an Ethernet connection, the AP 402 may forward the UL frame 450 with a 2-address format 456 having the first network MAC address (M) of the STA 104 in the SA field and the destination address (N) in the DA field. The router 405 receive the UL frame 450 and may forward the UL frame 450 having the same 2-address format 456 to the STA 404 having the destination address (N). The destination address (N) may be a fourth network MAC address that identifies the STA 404 in the WLAN 400. The router 405 may communicate with the STA 404 via a wired connection, such as Ethernet. In some implementations, the router 405 and the STA 404 also may have wireless communication capabilities and may communicate using wireless communication links.

In some implementations, the AP 102 may be connected with the router 405 or any other suitable local area network (LAN) device via a wired connection, such as Ethernet. The AP 102 may receive the UL frame 450 in a 3-address format as described herein. The AP 102 may transmit the UL frame 450 to the router 405 (or other suitable LAN device) in a 2-address format having the first network MAC address (M) of the STA 104 in the DA field and the fourth network MAC address (N) in the SA field.

Figure 5:
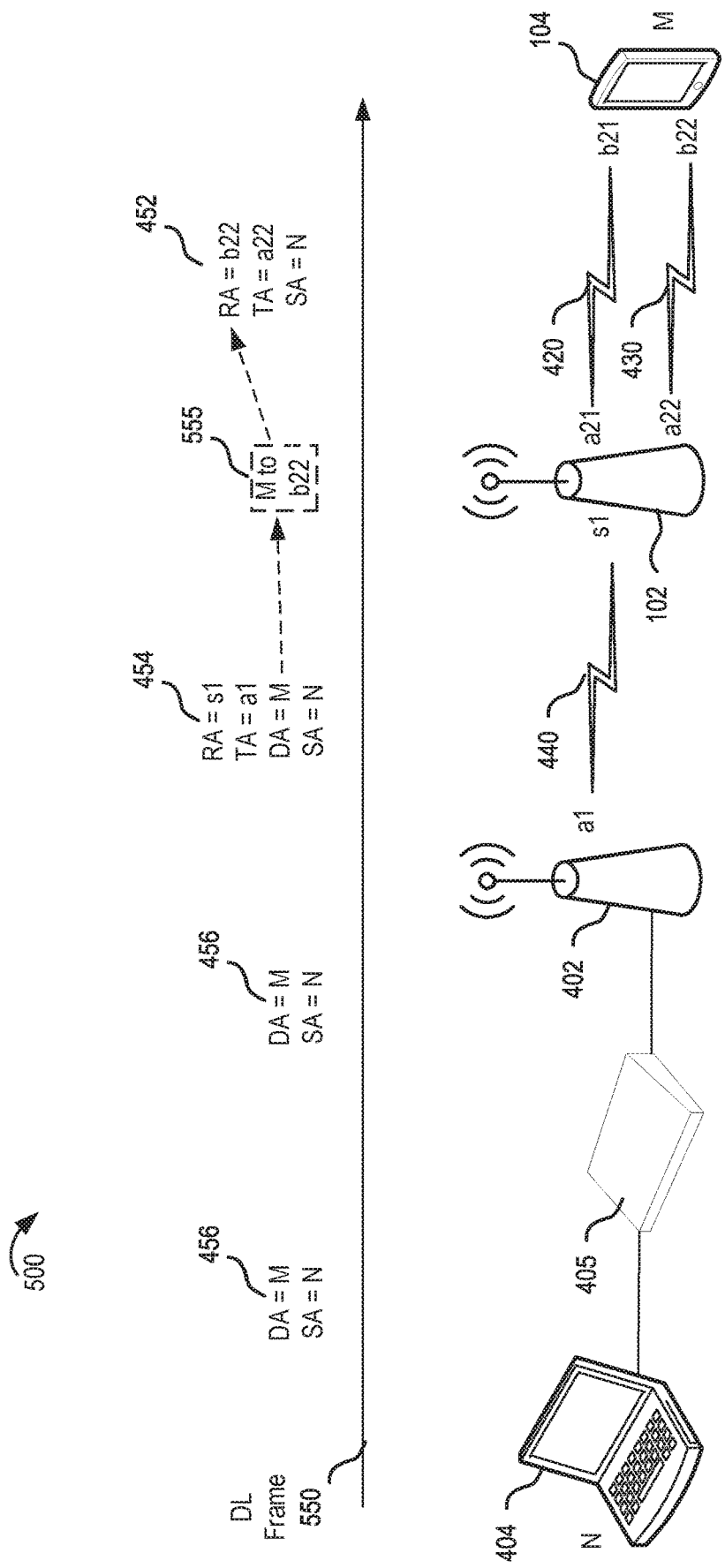
FIG. 5 shows a pictorial diagram of an example wireless communication network that supports performing address translation when forwarding a downlink (DL) frame during multi-link operation according to some implementations.

FIG. 5 shows a pictorial diagram of an example wireless communication network 500 that supports performing address translation when forwarding a downlink (DL) frame during multi-link operation according to some implementations. As described with reference to FIG. 4, the WLAN 500 may include a STA 104, an AP 102, an AP 402, a router 405, and a STA 404. In some implementations, the WLAN 400 may be a mesh network. In some implementations, the STA 404 may communicate with the router 405, and the router 405 may communication with the AP 402, using wired communications (such as Ethernet). The AP 402 may be a main AP or a central AP of the WLAN 400. In some implementations, the AP 102 may be a relay AP of the WLAN 400 that may relay frames received from the AP 402 to one or more STAs (such as the STA 104).

In some implementations, the STA 404 may have data to send to the STA 104. For example, the STA 404 may respond to the UL frame 450 the STA 104 transmitted to the STA 404 with a DL frame having the requested data or information. For example, the STA 404 may prepare a DL frame 550 to send to the STA 104 via the WLAN 400. The STA 404 may transmit the DL frame 550 to the router 405. The STA 404 may use a fourth network MAC address (N) as a network address for the WLAN 400. The DL frame 550 may have a 2-address format 456 having the first network MAC address (M) of the STA 104 in the DA field and the fourth network MAC address (N) in the SA field. The router 405 may receive the DL frame 550 and may forward the DL frame 550 having the same 2-address format 456 to the AP 402.

In some implementations, the AP 402 may receive the DL frame 550 having the 2-address format 456 and may change the format of the DL frame 550 to a 4-address format 454 in the MAC header in order to forward the DL frame 550 to the AP 102 via the third communication link 440. The 4-address format 454 may include an RA field, a TA field, a DA field, and an SA field. In some implementations, the AP 402 may retain the first network MAC address (M) of the STA 104 in the DA field and the fourth network MAC address (N) in the SA field. The AP 402 may insert or populate the TA field with the third network MAC address (a1) of the AP 402, and the RA field with the second network MAC address (s1) of the AP 102. The AP 402 may forward the DL frame 550 with the 4-address format 454 to the AP 102 via the third communication link 440. In some implementations, the RA field may correspond to the address1 (or A1) field of the MAC header, the TA field may correspond to the address2 (or A2) field of the MAC header, the DA field may correspond to the address3 (or A3) field of the MAC header, and the SA field may correspond to the address4 (or A4) field of the MAC header. The AP 102 may receive the DL frame 550 and may process the DL frame 550.

In some implementations, the AP 102 and the STA 104 may establish two or more communication links between the AP 102 and the STA 104 and implement multi-link operation. In some implementations, the AP 102 may have the first communication link 420 and a second communication link 430 with the STA 104. For example, the first communication link 420 may be in the first frequency band (such as the 2.4 GHz frequency band), and the second communication link 430 may be in a different frequency band (such as the 5 GHz or 6 GHz frequency bands). During multi-link operation, both the first communication link 420 and the second communication link 430 can be active and may be used by the AP 102 and the STA 104 to transmit frames concurrently. The AP 102 may select either the first communication link 420 or the second communication link 430 to transmit the DL frame 550 to the STA 104. For example, the AP 102 may select the second communication link 430 to transmit the DL frame 550 to the STA 104. The AP 102 may select the second communication link 430 to transmit the DL frame 550 for various reasons, such as if the first communication link 420 is busy (the AP 102 is already transmitting a different frame using the second communication link 430), or if the AP 102 prefers to use the 5 GHz frequency band to transmit the DL frame 550.

In some implementations, the AP 102 may use a link MAC address for each of the communication links that are established between the AP 102 and the STA 104. For example, the AP 102 may use the third link MAC address (a21) for the first communication link 420 and the fourth link MAC address (a22) for the second communication link 430. Each link MAC address of the AP 102 may correspond to a different MAC/PHY instance of a different WLAN interface of the AP 102. For example, the AP 102 may use a first MAC/PHY instance of a first WLAN interface that is associated with the third link MAC address for the first communication link 420, and a second MAC/PHY instance of a second WLAN interface that is associated with the fourth link MAC address for the second communication link 430. In some implementations, a first WLAN interface of the AP 102 may be used for the 2.4 GHz frequency band, and a second WLAN interface of the AP 102 may be used for the 5 GHz frequency band. Similar to the AP 102, the STA 104 may use a link MAC address for each of the communication links. For example, the STA 104 may use a first link MAC address (b21) for the first communication link 420 and a second link MAC address (b22) for the second communication link 430. Each link MAC address of the STA 104 may correspond to a different MAC/PHY instance of a different WLAN interface of the STA 104.

In some implementations, the AP 102 may receive the DL frame 550 having the 4-address format 454 and perform address translation to forward the DL frame 550 to the STA 104 via the second communication link 430. The AP 102 also may change the format of the DL frame 550 from a 4-address format 454 to the 3-address format 452 in the MAC header. Since the STA 104 uses link MAC addresses that identify the first network MAC address of the STA 104, the 3-address format 452 does not use the DA field. Thus, the 3-address format 452 may include the RA field, the TA field, and the SA field. In some implementations, the 3-address format 452 may be used in the Wi-Fi fronthaul and the 4-address format 454 may be used in the Wi-Fi backhaul. In some implementations, the AP 102 may translate 555 the first network MAC address (M) that is included in the DA field of the received DL frame 550 into the second link MAC address (b22) that is included in the RA field of the DL frame 550 that will be forwarded to the STA 104 via the second communication link 430. In some implementations, during the wireless association process between the AP 102 and the STA 104, the STA 104 may provide the first link MAC address, the second link MAC address, and the first network MAC address to the AP 102. The AP 102 stores and relates the first link MAC address, the second link MAC address, and the first network MAC address with the STA 104. The AP 102 also relates the first and second link MAC addresses to the first network MAC address. Thus, when the AP 102 identifies the first network MAC address in the received DL frame 550, the AP 102 can relate the first network MAC address to the first link MAC address based on the stored address information that was exchanged during the wireless association process.

In some implementations, when the AP 102 forwards the DL frame 550 having the 3-address format to the STA 104, the RA field may include the second link MAC address (b22) of the STA 104, the TA field may include the fourth link MAC address (a22) of the AP 102, and the SA field may include the fourth network MAC address (N) of the STA 404. As described herein, when the AP 102 forwards the DL frame 550 to the STA 104, the AP 102 may translate 555 the first network MAC address (M) that is included in the DA field of the received DL frame 550 into the second link MAC address (b22) that is included in the RA field of the DL frame 550 that will be forwarded to the STA 104 via the second communication link 430. For example, the AP 102 may replace the third network MAC address (a1) of the AP 402 in the TA field of the received DL frame 550 with the fourth link MAC address (a22) of the AP 102. The AP 102 also may replace the second network MAC address (s1) of the AP 102 in the RA field of the received DL frame 550 with the second link MAC address (b22) of the STA 104. The AP 102 may retain the fourth network MAC address (N) of the STA 404 in the SA field. In some implementations, the RA field may correspond to the address1 (or A1) field of the MAC header, the TA field may correspond to the address2 (or A2) field of the MAC header, and the SA field may correspond to the address3 (or A3) field of the MAC header. In some implementations, when the AP 102 forwards the DL frame 550 to the STA 104 via the second communication link 430, the first communication link 420 may remain active.

In some implementations, the AP 102 may be connected with the router 405 or any other suitable local area network (LAN) device via a wired connection, such as Ethernet. The AP 102 may receive the DL frame 550 in a 2-address format having the first network MAC address (M) of the STA 104 in the DA field and the fourth network MAC address (N) in the SA field. The AP 102 may transmit the DL frame 550 to the STA 104 in a 3-address format, where the RA field includes the second link MAC address (b22) of the STA 104, the TA field includes the fourth link MAC address (a22) of the AP 102, and the SA field includes the fourth network MAC address (N) of the STA 404.

Figure 6:
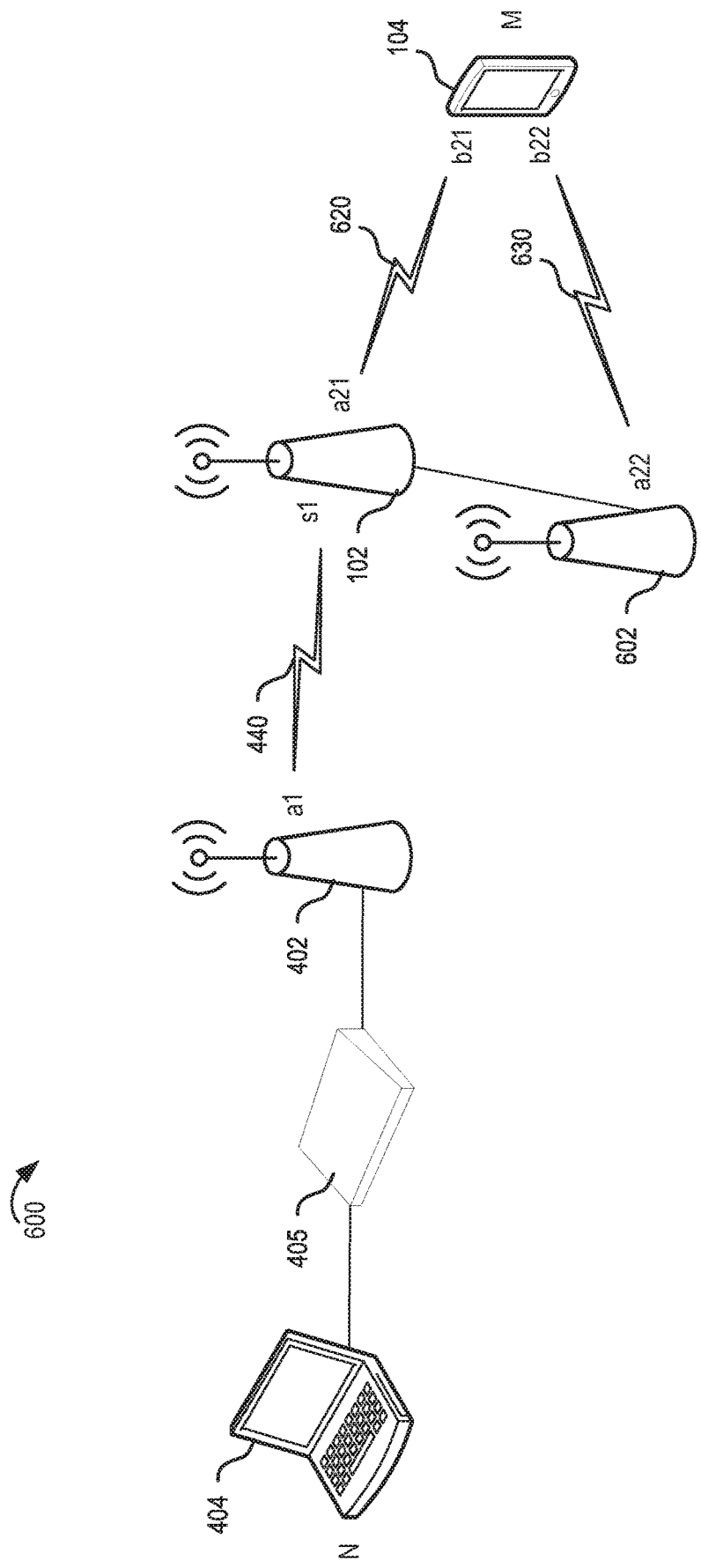
FIG. 6 shows a pictorial diagram of an example wireless communication network that includes non-collocated APs implementing multi-link operation according to some implementations.

FIG. 6 shows a pictorial diagram of an example wireless communication network that includes non-collocated APs implementing multi-link operation according to some implementations. The WLAN 600 may include a STA 104, an AP 102, an AP 602, an AP 402, a router 405, and a STA 404. In some implementations, the WLAN 600 may be a mesh network. In some implementations, the STA 404 may communicate with the router 405, the router 405 may communicate with the AP 402, and the AP 102 may communicate with the AP 602 using wired communications (such as Ethernet). The AP 402 may be a main AP or a central AP of the WLAN 600. In some implementations, the AP 102 may be a relay AP of the WLAN 600 that may relay frames received from the AP 402 to one or more STAs (such as the STA 104). In some implementations, the AP 102 and the AP 602 may be non-collocated APs that together implement multi-link operation. For example, the AP 102 may be configured as a master AP of the non-collocated APs and the AP 602 may be configured as a slave AP of the non-collocated APs. The AP 102 may communicate with the AP 602 via a wired connection (shown in FIG. 6), such as Ethernet, or via a wireless connection (not shown).

In some implementations, the STA 404 may transmit a DL frame to the router 405, and the router 405 and the AP 402 may forward the DL frame to the AP 102, similarly as described in FIG. 5. The AP 102 may receive the DL frame and determine whether to forward the DL frame to the STA 104 via the first communication link 620 or the second communication link 630. Similarly, as described in FIG. 5, the DL frame may include the first network MAC address (M) of the STA 104 in the DA field. In some implementations, when the AP 102 is configured as a master AP of the non-collocated APs and the AP 602 is configured as a slave AP of the non-collocated APs, the AP 102 may establish one of the communication links (such as the first communication link 620) with the STA 104, and the AP 602 may establish the other communication link (such as the second communication link 630) with the STA 104. If the AP 102 selects the first communication link 620 to transmit the DL frame to the STA 104, the AP 102 may translate the first network MAC address (M) of the STA 104 into the first link MAC address (b21) of the STA 104 that is associated with the first communication link 620. After address translation, the AP 102 may then transmit the DL frame having the first link MAC address (b21) to the STA 104 via the first communication link 620. If the AP 102 selects the second communication link 630 to transmit the DL frame to the STA 104, the AP 102 may translate the first network MAC address (M) of the STA 104 into the second link MAC address (b22) of the STA 104 that is associated with the second communication link 630. After address translation, the AP 102 may then transmit the DL frame having the second link MAC address (b22) to the AP 602, and the AP 602 may transmit the DL frame to the STA 104 via the second communication link 630.

In some implementations, the STA 104 may prepare to transmit an UL frame to the AP 102 or to the AP 602 that will be forwarded to the STA 404. The STA 104 may select either the first communication link 620 of the AP 102 or the second communication link 630 of the AP 602. Similarly as described in FIG. 4, when the STA 104 transmits the UL frame to the AP 102 via the first communication link 620, the STA 104 may include the first link MAC address (b21) of the STA 104 in the TA field, the third link MAC address (a21) of the AP 102 in the RA field, and the destination address N of the STA 404 in the DA field. When the STA 104 transmits the UL frame to the AP 602 via the second communication link 630, the STA 104 may include the second link MAC address (b22) of the STA 104 in the TA field, the fourth link MAC address (a22) of the AP 102 in the RA field, and the destination address N of the STA 404 in the DA field. In some implementations, after the AP 602 receives the UL frame, the AP 602 may forward the UL frame to the AP 102 for processing, such as performing the address translation from the 3-address format to the 4-address format.

In some implementations, after the AP 102 receives the UL frame (either from the STA 104 or from the AP 602), the AP 102 performs the address translation from the 3-address format to the 4-address format, as described in FIG. 4. The AP 102 may then transmit the UL frame to the AP 402. The AP 402 may forward the UL frame via the router 405 to the STA 404, as described in FIG. 4.

In some implementations, during the wireless association process between the STA 104 and the AP 102, the STA 104 may provide the first link MAC address, the second link MAC address, and the first network MAC address to the AP 102. The AP 102 stores and relates the first link MAC address, the second link MAC address, and the first network MAC address with the STA 104. The AP 102 associates the first and second link MAC addresses to the first network MAC address. Thus, when the AP 102 identifies the first link MAC address in the UL frame 450, the AP 102 can relate the first link MAC address to the first network MAC address based on the stored address information that was exchanged during the wireless association process. In some implementations, during the wireless association process, the AP 102 and the AP 602 may provide the network MAC address or the BSSID to the STA 104. Thus, when the STA 104 receives a DL frame, the STA 104 may identify whether the AP 102 or the AP 602 sent the DL frame to the STA 104. In some implementations, both the AP 102 and the AP 602 may use the same frequency channel of the same frequency band to transmit DL frames to the STA 104. Thus, the STA 104 may use the network MAC address or the BSSID included in the DL frame to identify whether the AP 102 or the AP 602 sent the DL frame to the STA 104.

Figure 7:
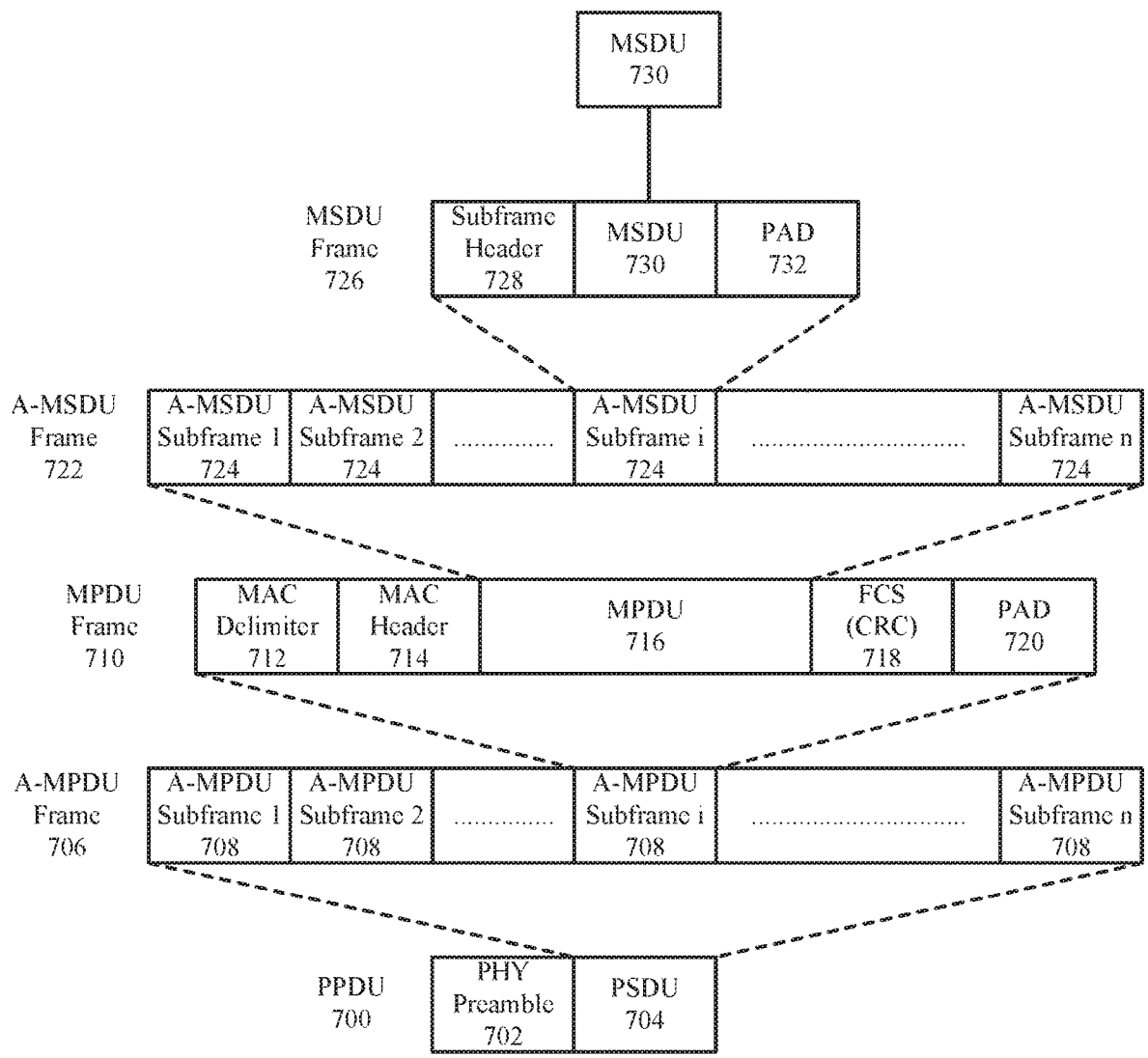
FIG. 7 shows an example physical layer convergence protocol (PLCP) protocol data units (PPDU) usable for communications between an AP and a number of STAs 104.

FIG. 7 shows an example PPDU 700 usable for communications between an AP 102 and a number of STAs 104. As described above, each PPDU 700 includes a PHY preamble 702 and a PSDU 704. Each PSDU 704 may represent (or "carry") one or more MAC protocol data units (MPDUs) 716. For example, each PSDU 704 may carry an aggregated MPDU (A-MPDU) 706 that includes an aggregation of multiple A-MPDU subframes 708. Each A-MPDU subframe 706 may include an MPDU frame 710 that includes a MAC delimiter 712 and a MAC header 714 prior to the accompanying MPDU 716, which comprises the data portion ("payload" or "frame body") of the MPDU frame 710. Each MPDU frame 710 may also include a frame check sequence (FCS) field 718 for error detection (for example, the FCS field may include a cyclic redundancy check (CRC)) and padding bits 720. The MPDU 716 may carry one or more MAC service data units (MSDUs) 722. For example, the MPDU 716 may carry an aggregated MSDU (A-MSDU) 722 including multiple A-MSDU subframes 724. Each A-MSDU subframe 724 contains a corresponding MSDU 730 preceded by a subframe header 728 and in some cases followed by padding bits 732.

Referring back to the MPDU frame 710, the MAC delimiter 712 may serve as a marker of the start of the associated MPDU 716 and indicate the length of the associated MPDU 716. The MAC header 714 may include a number of fields containing information that defines or indicates characteristics or attributes of data encapsulated within the frame body of the MPDU 716. The MAC header 714 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 714 also includes a number of fields indicating addresses for the data encapsulated within the frame body of the MPDU 716. For example, the MAC header 714 may have an address1 (or A1) field, an address 2 (or A2) field, an address3 (or A3) field, and an address4 (or A4) field. As described in FIGS. 4-6, when the MAC header 714 has a 3-address format, the TA, RA, and either the SA or the DA may be included in the MAC header 714. When the MAC header 714 has a 4-address format, the TA, RA, SA, and DA may be included in the MAC header 714. Also, as described in FIGS. 4-6, when forwarding UL or DL transmissions, the MAC header 714 may be converted from a 3-address format to a 4-address format or vice versa. The MAC header 714 may further include a frame control field containing control information. The frame control field may specify a frame type, for example, a data frame, a control frame, or a management frame.

Figure 8:
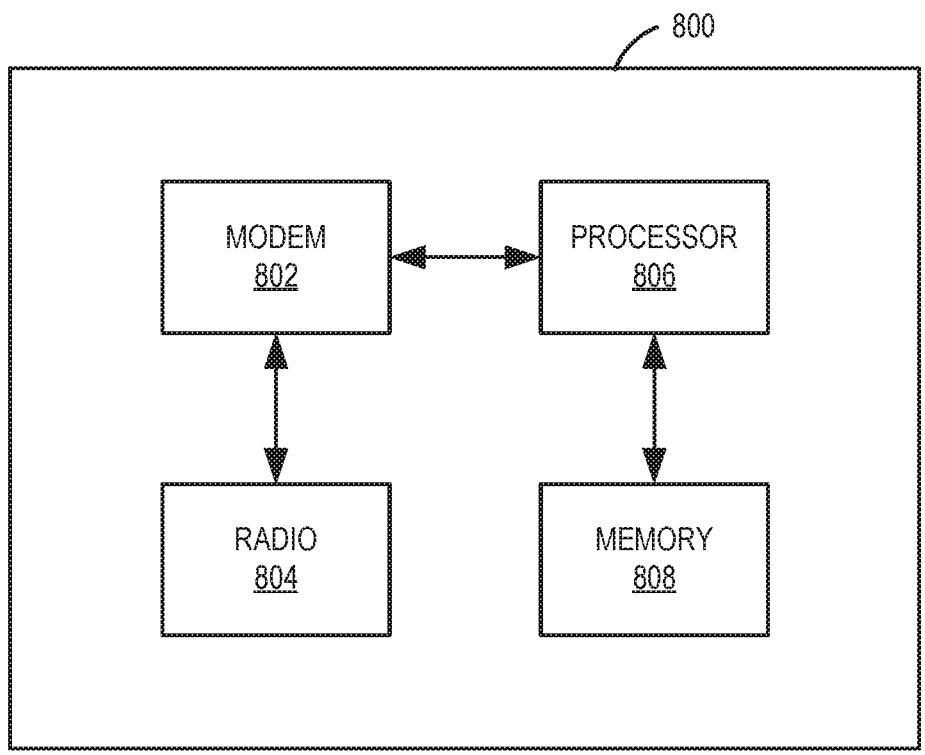
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11 ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9B:
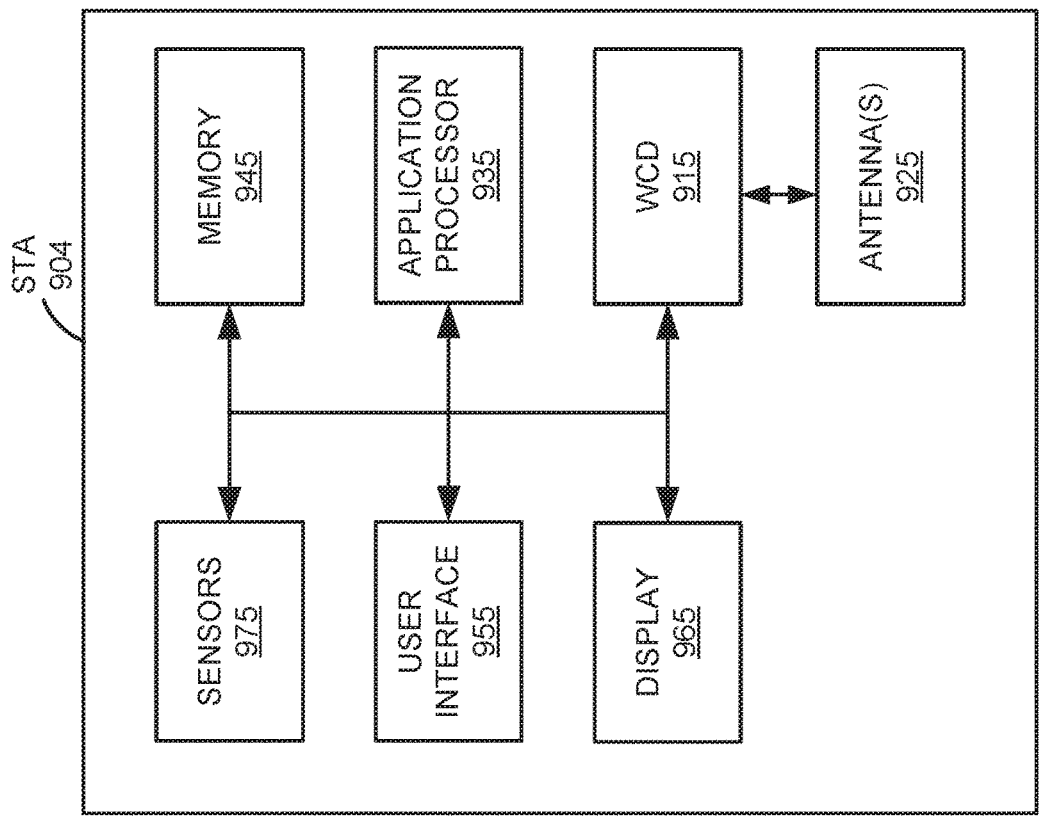
FIG. 9B shows a block diagram of an example STA.
Figure 9A:
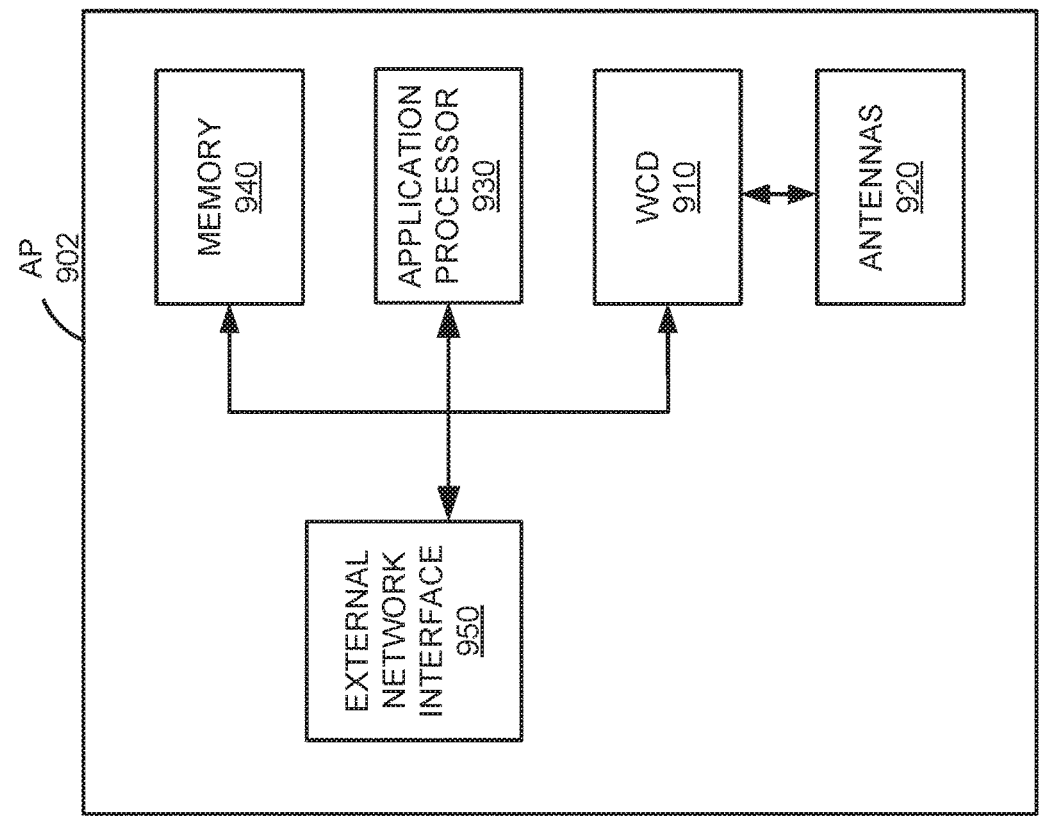
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915. For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

Various implementations relate generally to MAC address considerations when forwarding a frame during multi-link operation. In some implementations, an AP that has two or more communication links with a STA may perform address translation when forwarding an UL frame received from the STA via one of the communication links between the STA and the AP. The communication link may be associated with a link MAC address of the STA and a link MAC address of the AP. The link MAC address of the STA and the link MAC address of the AP may be known or discoverable only by the STA and the AP that established the first communication link (and may be hidden from or not discoverable by other WLAN devices). During a wireless association process, the AP and the STA may exchange link MAC addresses associated with the multiple communication links between the AP and the STA. For example, during the wireless association process, the STA may indicate to the AP that the link MAC address is associated with the communication link. The STA also may indicate the first MAC address of the STA is associated with a network MAC address of the STA. The network MAC address is the MAC address that is discoverable by other WLAN devices and used to identify the STA in the WLAN.

When the AP receives the UL frame from the STA, the AP may identify the link MAC address of the STA in the UL frame and determine that the STA transmitted the UL frame. The AP also may determine the network MAC address of the STA based on the link MAC address. In some implementations, the AP may translate the UL frame having a 3-address format including the link MAC address to a 4-address format including the network MAC address when forwarding the UL frame to the WLAN. The other WLAN devices in the WLAN may identify that the UL frame originated from the STA based on the network MAC address. In some implementations, the AP may similarly perform address translation when forwarding a downlink (DL) frame received from the WLAN to the STA via one of the multiple communication links. For example, the AP may translate the DL frame having a 4-address format including the network MAC address to a 3-address format including the link MAC address when forwarding the DL frame to the STA.

Particular implementations of the subject matter described in this disclosure can be implemented to realize one or more of the following potential advantages. One or more APs that have direct communication links to the STA perform address translation using different link MAC addresses when forwarding a DL or UL frame as part of a multi-link communication. Additionally, while other network devices (different from the AP(s) that provide the direct communication links) may be unable to recognize the different link MAC addresses as being related to the same STA, the APs that perform the address translation can also obfuscate the link MAC addresses such that the STA may be represented to the WLAN as having a single network MAC address. The other network devices of the WLAN can communication with the STA using the single network MAC address from anywhere in the WLAN, while only the APs that have the direct communication links use the link MAC addresses to communicate with the STA via multiple communication links to increase throughput, reliability, and redundancy.

Figure 10:
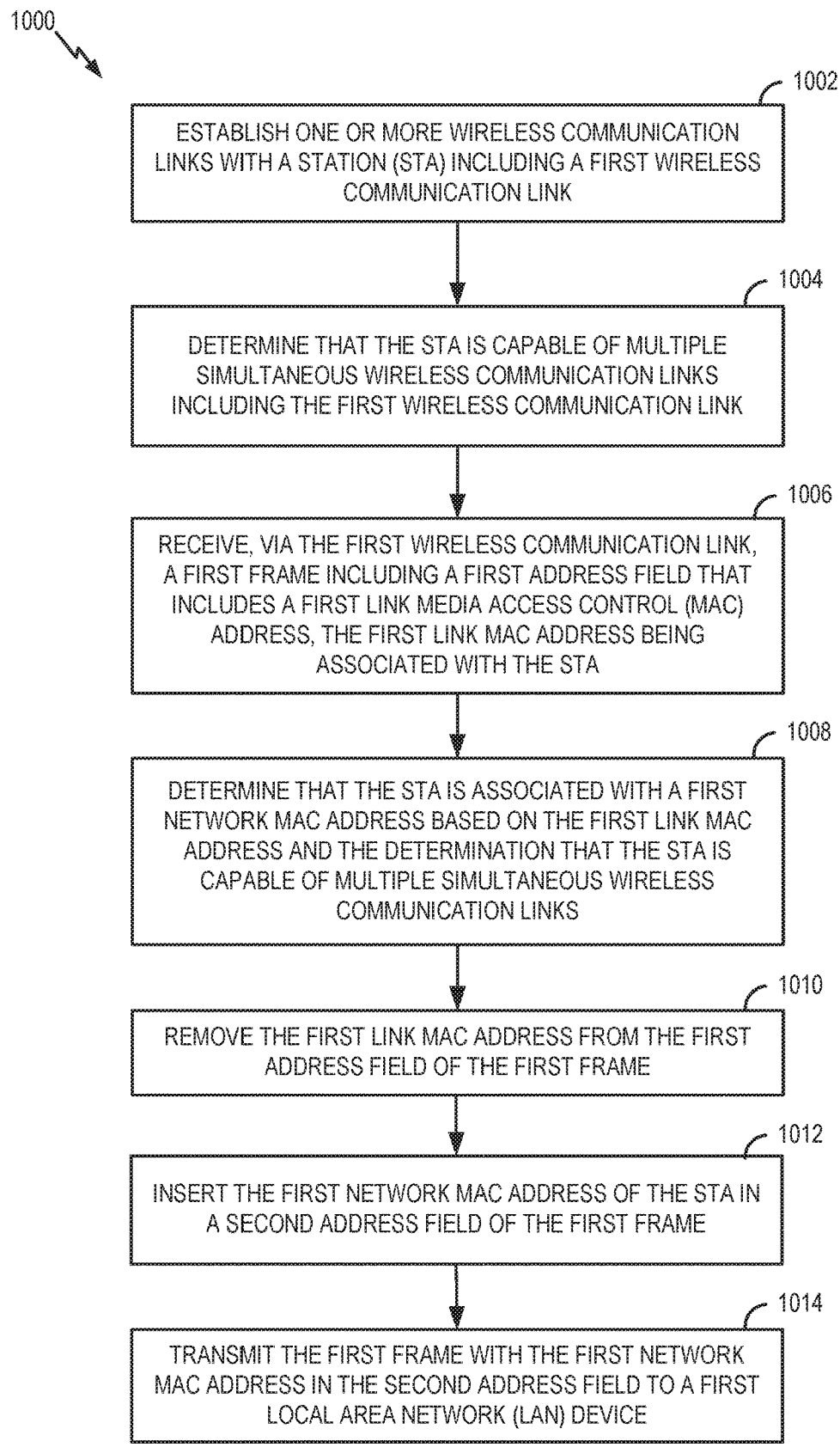
FIG. 10 shows a flowchart illustrating an example process performed by a first WLAN device for forwarding a UL frame according to some implementations.

FIG. 10 shows a flowchart illustrating an example process 1000 performed by a first WLAN device for forwarding an UL frame according to some implementations. The process 1000 may be performed by a wireless communication device such as the wireless communication device 800 described above with reference to FIG. 8. In some implementations, the process 1000 may be performed by a wireless communication device operating as or within an AP, such as one of the APs 102 and 902 described above with reference to FIGS. 1 and 9A, respectively. In some implementations, the process 1000 may be performed by a wireless communication device operating as or within a STA, such as one of the STAs 104 and 904 described above with reference to FIGS. 1 and 9B, respectively.

In some implementations, the process 1000 begins in block 1002 with establishing one or more wireless communication links with a STA including a first wireless communication link.

In block 1004, the process 1000 proceeds with determining that the STA is capable of multiple simultaneous wireless communication links including the first wireless communication link.

In block 1006, the process 1000 proceeds with receiving, via the first wireless communication link, a first frame including a first address field that includes a first link MAC address. The first link MAC address may be associated with the STA.

In block 1008, the process 1000 proceeds with determining that the STA is associated with a first network MAC address based on the first link MAC address and the determination that the STA is capable of multiple simultaneous wireless communication links.

In block 1010, the process 1000 proceeds with removing the first link MAC address from the first address field of the first frame. In some implementations, the first link MAC address being removed from the first address field of the first frame may include replacing the first link MAC address of the STA in the first address field of the first frame with a second network MAC address of the first WLAN device. In some implementations, the first address field may be a TA field of the first frame, such as the TA field of a MAC header of the first frame.

In block 1012, the process 1000 proceeds with inserting the first network MAC address of the STA in a second address field of the first frame. In some implementations, the second address field may be a SA field of the first frame, such as the SA field of a MAC header of the first frame.

In some implementations, the first wireless communication link is associated with the first link MAC address of the STA and a second link MAC address of the first WLAN device. In some implementations, the first frame that is received via the first wireless communication link may include a 3-address format having the first address field including the first link MAC address of the STA, a third address field including the second link MAC address of the first WLAN device, and a fourth address field including a destination address associated with a destination WLAN device. In some implementations, the first address field may be the TA field, the third address field may be the RA field, and the fourth address field may be the DA field of the first frame, such as the TA, RA, and DA fields of a MAC header of the first frame that is received from the STA via the first communication link.

In some implementations, the 3-address format of the first frame received from the STA may be changed to a 4-address format prior to transmitting the first frame to a third WLAN device. In some implementations, the 4-address format may include the first address field including the second network MAC address of the first WLAN device, the second address field including the first network MAC address of the STA, the third address field including a third network MAC address of the third WLAN device, and the fourth address field including the destination address associated with the destination WLAN device. In some implementations, the first address field may be the TA field, the second address field may be the SA field, the third address field may be the RA field, and the fourth address field may be the DA field of the first frame, such as the TA, SA, RA, and DA fields of a MAC header of the first frame that is transmitted to the third WLAN device.

In block 1014, the process 1000 proceeds with transmitting the first frame with the first network MAC address in the second address field to a first local area network (LAN) device.

Figure 11:
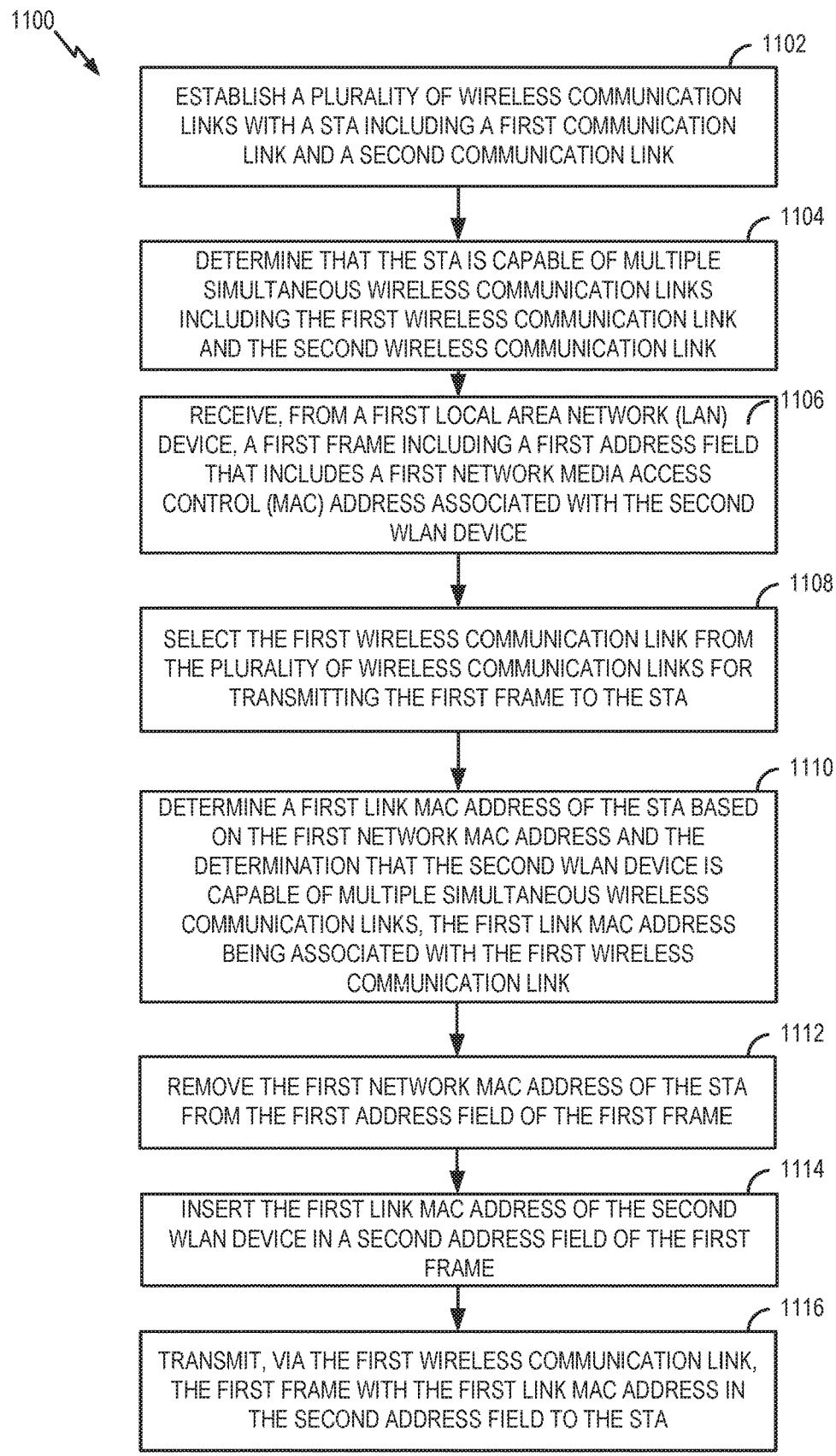
FIG. 11 shows a flowchart illustrating an example process performed by a first WLAN device for forwarding a DL frame according to some implementations.

FIG. 11 shows a flowchart illustrating an example process 1100 performed by a first WLAN device for forwarding a DL frame according to some implementations. The process 1100 may be performed by a wireless communication device such as the wireless communication device 800 described above with reference to FIG. 8. In some implementations, the process 1100 may be performed by a wireless communication device operating as or within an AP, such as one of the APs 102 and 902 described above with reference to FIGS. 1 and 9A, respectively. In some implementations, the process 1100 may be performed by a wireless communication device operating as or within a STA, such as one of the STAs 104 and 904 described above with reference to FIGS. 1 and 9B, respectively.

In some implementations, the process 1100 begins in block 1102 with establishing a plurality of wireless communication links with a STA including a first wireless communication link and a second wireless communication link.

In block 1104, the process 1100 proceeds with determining that the STA is capable of multiple simultaneous wireless communication links including the first wireless communication link and the second wireless communication link.

In block 1106, the process 1100 proceeds with receiving, from a first LAN device, a first frame including a first address field that includes a first network MAC address associated with the STA.

In block 1108, the process 1100 proceeds with selecting the first wireless communication link from the plurality of wireless communication links for transmitting the first frame to the STA.

In block 1110, the process 1100 proceeds with determining a first link MAC address of the STA based on the first network MAC address and the determination that the STA is capable of multiple simultaneous wireless communication links. The first link MAC address may be associated with the first wireless communication link.

In block 1112, the process 1100 proceeds with removing the first network MAC address of the STA from the first address field of the first frame. In some implementations, the first address field may be a DA field of the first frame, such as the DA field of a MAC header of the first frame received from the first LAN device.

In block 1114, the process 1100 proceeds with inserting the first link MAC address of the STA in a second address field of the first frame. In some implementations, the first frame received from the first LAN device may include a second network MAC address of the first WLAN device in the second address field of the first frame. In some implementations, the first link MAC address of the STA being inserted in the second address field of the first frame may include replacing the second network MAC address in the second address field of the first frame with the first link MAC address of the STA. In some implementations, the second address field may be an RA field of the first frame, such as the RA field of a MAC header of the first frame received from the first LAN device.

In some implementations, the first frame received from the first LAN device may include a 4-address format having the first address field including the first network MAC address associated with the STA, the second address field including the second network MAC address of the first WLAN device, a third address field including a third network MAC address of the first LAN device, and a fourth address field including a source address associated with a source WLAN device. In some implementations, the first address field may be the DA field, the second address field may be the RA field, the third address field may be the TA field, and the fourth address field may be the SA field of the first frame, such as the DA, RA, TA, and SA fields of a MAC header of the first frame that is received from the first LAN device.

In some implementations, the 4-address format of the first frame received from the first LAN device may be changed to a 3-address format prior to transmitting the first frame to the STA. In some implementations, the 3-address format may include the second address field including the first link MAC address of the STA, the third address field including a second link MAC address of the first WLAN device, and the fourth address field including the source address associated with the source WLAN device. In some implementations, the second address field may be the RA field, the third address field may be the TA field, and the fourth address field may be the SA field of the first frame, such as the RA, TA, and SA fields of a MAC header of the first frame that is transmitted to the STA.

In block 1116, the process 1100 proceeds with transmitting, via the first communication link, the first frame with the first link MAC address in the second address field to the STA.

Figure 12:
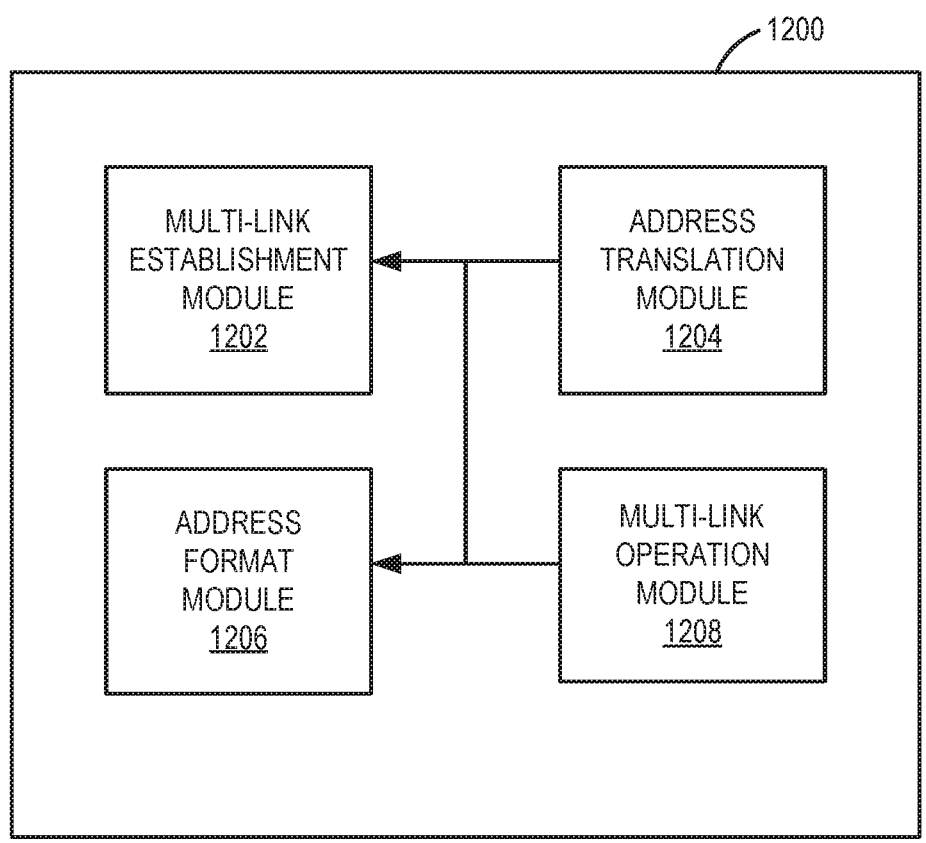
FIG. 12 shows a block diagram of an example wireless communication device according to some implementations.

FIG. 12 shows a block diagram of an example wireless communication device 1200 according to some implementations. In some implementations, the wireless communication device 1200 is configured to perform one or more of the processes described above. The wireless communication device 1200 may be an example implementation of the wireless communication device 800 described above with reference to FIG. 8. For example, the wireless communication device 1200 can be a chip, SoC, chipset, package or device that includes at least one processor and at least one modem (for example, a Wi-Fi (IEEE 802.11) modem or a cellular modem). In some implementations, the wireless communication device 1200 can be a device for use in an AP, such as one of the APs 102 and 902 described above with reference to FIGS. 1 and 9A, respectively. In some implementations, the wireless communication device 1200 can be a device for use in a STA, such as one of the STAs 104 and 904 described above with reference to FIGS. 1 and 9B, respectively. In some other implementations, the wireless communication device 1200 can be an AP or a STA that includes such a chip, SoC, chipset, package or device as well as at least one transmitter, at least one receiver, and at least one antenna.

The wireless communication device 1200 includes a multi-link establishment module 1202, an address translation module 1204, an address format module 1206 and a multi-link operation module 1208. Portions of one or more of the modules 1202, 1204, 1206 and 1208 may be implemented at least in part in hardware or firmware. For example, the multi-link establishment module 1202, the address translation module 1204, the address format module 1206 and the multi-link operation module 1208 may be implemented at least in part by a modem (such as the modem 802). In some implementations, portions of some of the modules 1202, 1204, 1206 or 1208 may be implemented at least in part as software stored in a memory (such as the memory 808). For example, portions of one or more of the modules 1202, 1204, 1206 or 1208 can be implemented as non-transitory instructions (or "code") executable by a processor (such as the processor 806) to perform the functions or operations of the respective module.

The multi-link establishment module 1202 may be configured to establish communication links for a multi-link operation. For example, the multi-link establishment module 1202 may establish one or more communication links that are part of a group of communication links used for the multi-link operation. The multi-link operation may support aggregation of multiple communication links between different WLAN interfaces (not shown) of the wireless communication device 1200.

The address translation module 1204 may be configured to translate a network MAC address to a link MAC address, and vice versa. For example, for DL frames, the address translation module 1204 may translate a destination address (DA) (representing a network MAC address) to a receiver address (RA) (representing a link MAC address for one of the communication links to the destination WLAN device. For UL frames, the address translation module 1204 may translate a transmitter address (TA) (representing a link MAC address) to a source address (SA) (representing a network MAC address of the transmitting STA).

The address format module 1206 may be configured to determine when to use a 3-address format or a 4-address format. The 3-address format may be used on a wireless communication link and the 4-address format may be used for a wired communication link.

The multi-link operation module 1208 may be configured to transmit the MPDUs via the communication links. The multi-link operation module 1208 also may determine that multi-link aggregation is supported by the wireless communication device 1200 and another WLAN device.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by an access point (AP), comprising:
    establishing one or more wireless communication links with a station (STA) including a first wireless communication link;
    determining that the STA is capable of multiple simultaneous wireless communication links including the first wireless communication link;
    receiving, via the first wireless communication link, a first frame including a first address field that includes a first link media access control (MAC) address, the first link MAC address being associated with the STA;
    determining that the STA is associated with a first network MAC address based on the first link MAC address and the determination that the STA is capable of multiple simultaneous wireless communication links;
    removing the first link MAC address from the first address field of the first frame;
    inserting the first network MAC address of the STA in a second address field of the first frame; and
    transmitting the first frame with the first network MAC address in the second address field to a first local area network (LAN) device.

2. The method of claim 1, further comprises:
    inserting a second network MAC address of the AP in the first address field of the first frame, wherein the first frame transmitted to the first LAN device further includes the second network MAC address of the AP in the first address field.

3. The method of claim 1, wherein the one or more wireless communication links with the STA further include a second wireless communication link, the first wireless communication link associated with the first link MAC address of the STA and a second link MAC address of the AP, and the second wireless communication link associated with a third link MAC address of the STA and a fourth link MAC address of the AP, wherein the first link MAC address, the second link MAC address, the third link MAC address and the fourth link MAC address are different MAC addresses.

4. The method of claim 1, wherein the first wireless communication link is associated with the first link MAC address of the STA and a second link MAC address of the AP, and wherein the first frame received via the first wireless communication link includes a 3-address format having the first address field including the first link MAC address of the STA, a third address field including the second link MAC address of the AP, and a fourth address field including a destination address associated with a destination LAN device.

5. The method of claim 1, further comprising:
changing a 3-address format of the first frame received from the STA to a 4-address format prior to transmitting the first frame to the first LAN device, the 4-address format having the first address field including a second network MAC address of the AP, the second address field including the first network MAC address of the STA, a third address field including a third network MAC address of the first LAN device, and a fourth address field including a destination address associated with a destination LAN device.

6. The method of claim 1, wherein a second wireless communication link is established between the STA and a first wireless LAN device, the second wireless communication link associated with a second link MAC address of the STA, and wherein the AP is configured as a master AP and the first wireless LAN device is configured as a non-collocated slave AP for implementing multi-link operations with the AP, the method further comprising:
receiving a second frame including a second address field that includes the second link MAC address associated with the STA from the first LAN device, the second frame obtained by the first wireless LAN device via the second wireless communication link;
determining that the STA is associated with the first network MAC address based on the second link MAC address;
removing the second link MAC address from the first address field of the second frame;
inserting the first network MAC address of the STA into the second address field of the second frame; and
transmitting the second frame with the first network MAC address in the second address field to the first LAN device.

7. The method of claim 1, further comprising:
inserting a destination address associated with a destination LAN device into a third address field of the first frame, wherein the first frame transmitted to the first LAN device has a two-address format including the first network MAC address in the second address field and the destination address in the third address field.

8. The method of claim 1, further comprising:
changing a 3-address format of the first frame received from the STA to a 2-address format prior to transmitting the first frame to the first LAN device, the 2-address format having the second address field including the first network MAC address of the STA and a third address field including a destination address associated with a destination LAN device.

9. A method for wireless communication by an access point (AP), comprising:
establishing a plurality of wireless communication links with a station (STA) including a first wireless communication link and a second wireless communication link;
determining that the STA is capable of multiple simultaneous wireless communication links including the first wireless communication link and the second wireless communication link;
receiving, from a first local area network (LAN) device, a first frame including a first address field that includes a first network media access control (MAC) address associated with the STA;
selecting the first wireless communication link from the plurality of wireless communication links for transmitting the first frame to the STA;
determining a first link MAC address of the STA based on the first network MAC address and the determination that the STA is capable of multiple simultaneous wireless communication links, the first link MAC address being associated with the first wireless communication link;
removing the first network MAC address of the STA from the first address field of the first frame;
inserting the first link MAC address of the STA in a second address field of the first frame; and
transmitting, via the first wireless communication link, the first frame with the first link MAC address in the second address field to the STA.

10. The method of claim 9, wherein the first frame received from the first LAN device includes a second network MAC address of the AP in the second address field of the first frame, the method further comprising:
replacing the second network MAC address in the second address field of the first frame with the first link MAC address of the STA.

11. The method of claim 9, further comprising:
transmitting the first frame via the first wireless communication link and a second frame via the second wireless communication link concurrently.

12. The method of claim 9, wherein the first wireless communication link is associated with the first link MAC address of the STA and a second link MAC address of the AP, and the second wireless communication link is associated with a third link MAC address of the STA and a fourth link MAC address of the AP, wherein the first link MAC address, the second link MAC address, the third link MAC address and the fourth link MAC address are different MAC addresses.

13. The method of claim 12, wherein the first link MAC address, the second link MAC address, the third link MAC address, and the fourth link MAC address are used for frame transmissions between the AP and the STA, and wherein the first link MAC address, the second link MAC address, the third link MAC address, and the fourth link MAC address are not discoverable by other wireless LAN devices.

14. The method of claim 9, wherein the first frame received from the first LAN device includes a 4-address format having the first address field including the first network MAC address associated with the STA, the second address field including a second network MAC address of the AP, a third address field including a third network MAC address of the first LAN device, and a fourth address field including a source address associated with a source wireless LAN device.

15. The method of claim 9, further comprising:
changing a 4-address format of the first frame received from the first LAN device to a 3-address format prior to transmitting the first frame to the STA, the 3-address format having the second address field including the first link MAC address of the STA, a third address field including a second link MAC address of the AP, and a fourth address field including a source address associated with a source wireless LAN device.

16. The method of claim 9, further comprising:
changing a 2-address format of the first frame received from the first LAN device to a 3-address format prior to transmitting the first frame to the STA, the 3-address format having the second address field including the first link MAC address of the STA, a third address field including a second link MAC address of the AP and a fourth address field including a network MAC address of the first LAN device.

17. The method of claim 9, further comprising:
inserting a network MAC address associated with the first LAN device into a third address field of the first frame and a second link MAC address associated with the AP into a fourth address field of the first frame, wherein the first frame has a three-address format including the first link MAC address in the second address field, the network MAC address in the third address field and the second link MAC address in the fourth address field.

18. An access point (AP) comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform operations for wireless communications, the processor-readable code configured to
 establish one or more wireless communication links with a station (STA) including a first wireless communication link,
 determine that the STA is capable of multiple simultaneous wireless communication links including the first wireless communication link;
 receive, via the first wireless communication link, a first frame including a first address field that includes a first link media access control (MAC) address, the first link MAC address being associated with the STA,
 determine that the STA is associated with a first network MAC address based on the first link MAC address and the determination that the STA is capable of multiple simultaneous wireless communication links,
 remove the first link MAC address from the first address field of the first frame;
 insert the first network MAC address of the STA in a second address field of the first frame, and
 transmit the first frame with the first network MAC address in the second address field to a first local area network (LAN) device.

19. The AP of claim 18, wherein the processor-readable code is further configured to:
insert a second network MAC address of the AP in the first address field of the first frame, wherein the first frame transmitted to the first LAN device further includes the second network MAC address of the AP in the first address field.

20. The AP of claim 18, wherein the one or more wireless communication links with the STA further include a second wireless communication link, the first wireless communication link associated with the first link MAC address of the STA and a second link MAC address of the AP, and the second wireless communication link associated with a third link MAC address of the STA and a fourth link MAC address of the AP, wherein the first link MAC address, the second link MAC address, the third link MAC address and the fourth link MAC address are different MAC addresses.

21. The AP of claim 18, wherein the first wireless communication link is associated with the first link MAC address of the STA and a second link MAC address of the AP, and wherein the first frame received via the first wireless communication link includes a 3-address format having the first address field including the first link MAC address of the STA, a third address field including the second link MAC address of the AP, and a fourth address field including a destination address associated with a destination LAN device.

22. The AP of claim 18, wherein the processor-readable code is further configured to:
 change a 3-address format of the first frame received from the STA to a 4-address format prior to transmission the first frame to the first LAN device, the 4-address format having the first address field including a second network MAC address of the AP, the second address field including the first network MAC address of the STA, a third address field including a third network MAC address of the first LAN device, and a fourth address field including a destination address associated with a destination LAN device.

23. The AP of claim 18, wherein a second wireless communication link is established between the STA and a fourth wireless LAN device, the second wireless communication link associated with a second link MAC address of the STA, and wherein the AP is configured as a master AP and the first wireless LAN device is configured as a non-collocated slave AP for implementing multi-link operations with the AP, wherein the processor-readable code is further configured to:
 receive a second frame including a second address field that includes the second link MAC address associated with the STA from the first wireless LAN device, the second frame obtained by the first wireless LAN device via the second wireless communication link;
 determine that the STA is associated with the first network MAC address based on the second link MAC address;
 remove the second link MAC address from the first address field of the second frame;
 insert the first network MAC address of the STA into the second address field of the second frame; and
 transmit the second frame with the first network MAC address in the second address field to the first LAN device.

24. The AP of claim 18, wherein the processor-readable code is further configured to:
 insert a destination address associated with a destination LAN device into a third address field, wherein the first frame transmitted to the first LAN device has a two-address format including the first network MAC address in the second address field and the destination address in the third address field.

25. An access point (AP) comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform operations for wireless communications, the processor-readable code configured to:

establish a plurality of wireless communication links with a station (STA) including a first wireless communication link and a second wireless communication link;

determine that the STA is capable of multiple simultaneous wireless communication links including the first wireless communication link and the second wireless communication link;

receive, from a first local area network (LAN) device, a first frame including a first address field that includes a first network MAC address associated with the STA;

select the first wireless communication link from the plurality of wireless communication links for transmitting the first frame to the STA;

determine a first link MAC address of the STA based on the first network MAC address and the determination that the STA is capable of multiple simultaneous wireless communication links, the first link MAC address being associated with the first wireless communication link;

remove the first network MAC address of the STA from the first address field of the first frame;

insert the first link MAC address of the STA in a second address field of the first frame; and transmit, via the first wireless communication link, the first frame with the first link MAC address in the second address field to the STA.

26. The AP of claim 25, wherein the first frame received from the first LAN device includes a second network MAC address of the AP in the second address field of the first frame, the processor-readable code further configured to replace the second network MAC address in the second address field of the first frame with the first link MAC address of the STA.

27. The AP of claim 25, wherein the first wireless communication link is associated with the first link MAC address of the STA and a second link MAC address of the AP, and the second wireless communication link is associated with a third link MAC address of the STA and a fourth link MAC address of the AP.

28. The AP of claim 27, wherein the first link MAC address, the second link MAC address, the third link MAC address, and the fourth link MAC address are used for frame transmissions between the AP and the STA, and wherein the first link MAC address, the second link MAC address, the third link MAC address, and the fourth link MAC address are not discoverable by other LAN devices.

29. The AP of claim 25, wherein the first frame received from the first LAN device includes a 4-address format having the first address field including the first network MAC address associated with the STA, the second address field including a second network MAC address of the AP, a third address field including a third network MAC address of the first LAN device, and a fourth address field including a source address associated with a source LAN device.

30. The AP of claim 25, where the processor-readable code is further configured to:

change a 4-address format of the first frame received from the first LAN device to a 3-address format prior to transmitting the first frame to the STA, the 3-address format having the second address field including the first link MAC address of the STA, a third address field including a second link MAC address of the AP, and a fourth address field including a source address associated with a source LAN device.

* * * * *